United States Patent
Chatterjee et al.

(10) Patent No.: US 12,547,664 B1
(45) Date of Patent: Feb. 10, 2026

(54) UPDATING OBJECT MODEL DATA OF INTERFACE ELEMENTS BASED ON EMISSION SCORES

(71) Applicant: International Business Machines Corporation, Armonk, NY (US)

(72) Inventors: Charbak Chatterjee, Kolkata (IN); Chinmohan Biswas, Kolkata (IN); Debajyoti Mukherjee, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/999,129

(22) Filed: Dec. 23, 2024

(51) Int. Cl.
  *G06F 16/906* (2019.01)
  *G06F 16/9035* (2019.01)

(52) U.S. Cl.
  CPC ........ *G06F 16/906* (2019.01); *G06F 16/9035* (2019.01)

(58) Field of Classification Search
  CPC ............................ G06F 16/906; G06F 16/9035
  USPC ........................................................ 707/737
  See application file for complete search history.

(56) References Cited

U.S. PATENT DOCUMENTS

| | | | |
|---|---|---|---|
| 11,294,784 B1 * | 4/2022 | Bergman | G06N 20/00 |
| 11,880,546 B2 * | 1/2024 | De Leon | G06F 3/0488 |
| 2011/0289082 A1 | 11/2011 | Townsend | |
| 2017/0351978 A1 | 12/2017 | Bellowe | |
| 2023/0059038 A1 | 2/2023 | Sidhu et al. | |
| 2024/0169368 A1 | 5/2024 | Thakkar | |

FOREIGN PATENT DOCUMENTS

CA 2741883 C 2/2019

OTHER PUBLICATIONS

Vallerio, Keith S., et al., "Energy-Efficient Graphical User Interface Design", IEEE Transactions on Mobile Computing, vol. 5, No. 7, Jul. 2006, pp. 846-859.*
Harter, Tim, et al., "Energy-aware User Interfaces: An Evaluation of User Acceptance", CHI 2004, Vienna, Austria, Apr. 24-29, 2004, pp. 199-206.*
Authors et al., Disclosed Anonymous, System and Method for Decomposing Business Processes into Sets of Carbon-Aware Solution Components, IPCOM000274376D, May 9, 2024, 7 pages.

(Continued)

*Primary Examiner* — Robert Stevens
(74) *Attorney, Agent, or Firm* — CHIP LAW GROUP

(57) ABSTRACT

Updating of object model data of interface elements based on emission scores includes receiving first interaction data associated with an interaction session between a specific user and one or more interface elements of an operation of an application. A user emission score associated with the interaction session is generated based on the interaction data. A first cluster from a plurality of clusters is identified for the specific user based on the user emission score and cluster data. A cluster emission score associated with the first cluster is generated based on the user emission score and the cluster data associated with the first cluster. Further, object model data associated with each interface element of the one or more interface elements is received. The object model data associated with at least one interface element is updated. The updated object model data is output.

20 Claims, 9 Drawing Sheets

(56) References Cited

OTHER PUBLICATIONS

Authors et al., Disclosed Anonymous, System and Method to Provide User-Level Carbon Footprint Scoring for Digital Interaction, IPCOM000266232D, Jun. 24, 2021, 6 pages.

Coyier, C., Thinking-About-Power-Usage-And-Websites, Retrieved from: https://css-tricks.com/thinking-about-power-usage-and-websites/, Sep. 21, 2020, 4 pages.

\* cited by examiner

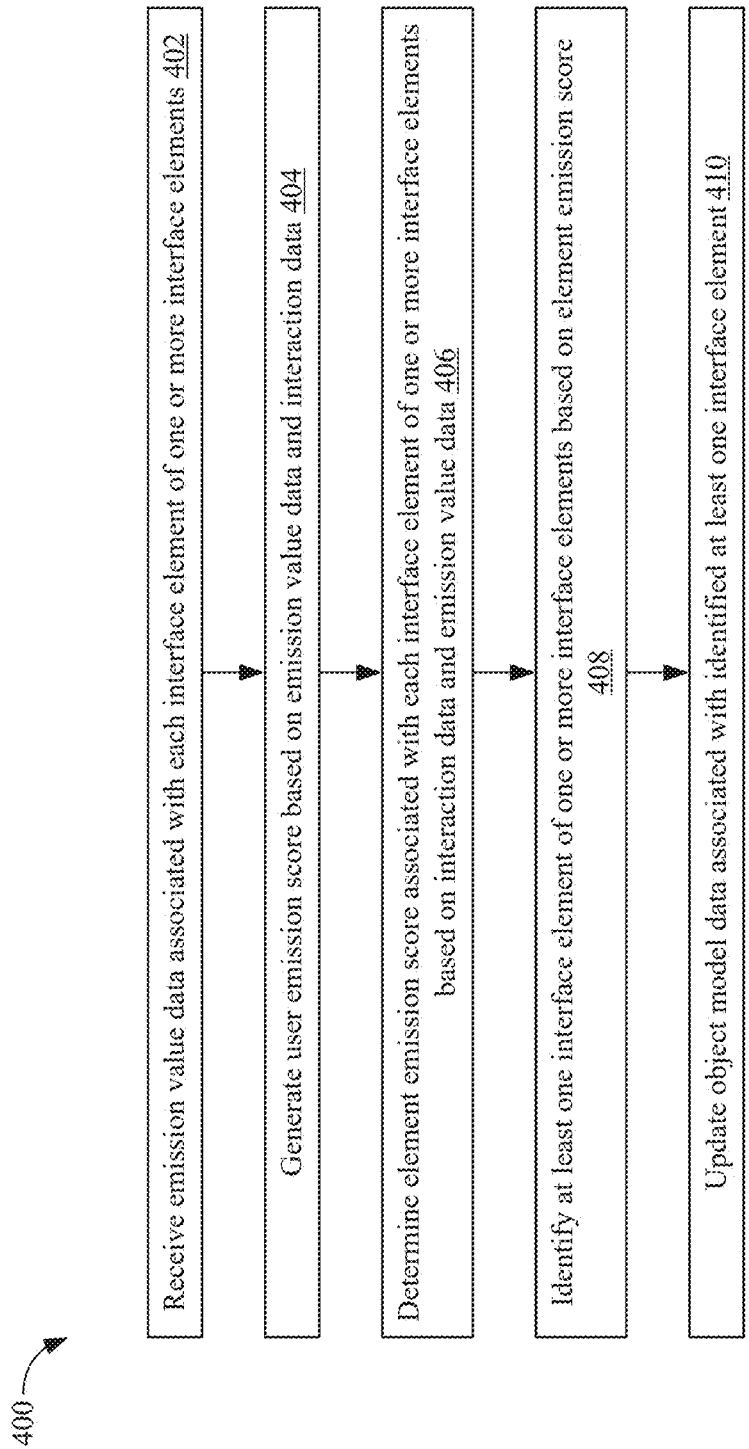

UPDATING OBJECT MODEL DATA OF INTERFACE ELEMENTS BASED ON EMISSION SCORES

BACKGROUND

The disclosure relates to updating object model data of the interface elements and more particularly, to updating object model data of the interface elements based on emission scores of users.

As awareness of climate change grows, there is increasing interest in tools that help individuals and organizations monitor and reduce their carbon footprint. While much attention has been given to emissions from transportation and industrial processes, the carbon emissions generated by digital activities, particularly application usage, remain less explored.

With more users relying on digital platforms for various tasks, the energy consumption associated with these applications has risen significantly. This energy use, primarily driven by data processing and cloud services contributes to carbon emissions, especially owing to the use of non-renewable sources of electricity for powering data centers.

SUMMARY

According to an embodiment of the disclosure, a computer-implemented method for updating object model data of interface elements based on emission scores is described. The computer-implemented method includes receiving, by a computer, first interaction data associated with an interaction session between a specific user and one or more interface elements of an operation of an application. The computer-implemented method further includes generating, by the computer, a user emission score associated with the interaction session of the specific user based on the first interaction data. The computer implemented method further includes identifying, by the computer, a first cluster from a plurality of clusters for the specific user based on the user emission score and cluster data. The cluster data is associated with each cluster of the plurality of clusters. The computer implemented method further includes generating, by the computer, a cluster emission score associated with the first cluster based on the user emission score and the cluster data associated with the first cluster. The computer implemented method further includes receiving, by the computer, object model data associated with each interface element of the one or more interface elements. The computer implemented method further includes updating, by the computer, the object model data associated with at least one interface element of the one or more interface elements based on the cluster emission score. The computer implemented method further includes outputting, by the computer, the updated object model data.

According to one or more embodiments of the disclosure, a computer system for updating object model data of interface elements based on emission scores is disclosed. The computer system includes a processor set, one or more computer-readable storage media, and program instructions stored on the one or more computer-readable storage media. The program instructions are executable by the processor set to cause the processor set to receive first interaction data associated with an interaction session between a specific user and one or more interface elements of an operation of an application. The program instructions cause the processor set to generate a user emission score associated with the interaction session of the specific user based on the first interaction data. The program instructions cause the processor set to identify a first cluster from a plurality of clusters for the specific user based on the user emission score and cluster data. The cluster data is associated with each cluster of the plurality of clusters. The program instructions cause the processor set to generate a cluster emission score associated with the first cluster based on the user emission score and the cluster data associated with the first cluster. The program instructions cause the processor set to receive object model data associated with each interface element of the one or more interface elements. The program instructions cause the processor set to update the object model data associated with at least one interface element of the one or more interface elements based on the cluster emission score. The program instructions cause the processor set to render the at least one interface element of the one or more interface elements on a user device based on the updated object model data. The at least one interface element is rendered concurrently with the interaction session.

According to one or more embodiments of the disclosure, a computer program product for updating of object model data of interface elements based on emission scores is disclosed. The computer program product includes one or more computer-readable storage media and program instructions stored on the one or more computer-readable storage media to perform operations. The operations include receiving interaction data associated with an interaction session between a specific user and one or more interface elements of an operation of an application. The operations further include generating a user emission score associated with the interaction session of the specific user based on the first interaction data. The operations further include identifying a first cluster from a plurality of clusters for the specific user based on the user emission score and cluster data. The cluster data is associated with each cluster of the plurality of clusters. The operations further include generating a cluster emission score associated with the first cluster based on the user emission score and the cluster data associated with the first cluster. The operations further include receiving object model data associated with each interface element of the one or more interface elements. The operations further include updating the object model data associated with at least one interface element of the one or more interface elements based on the cluster emission score. The operations further include outputting the updated object model data.

BRIEF DESCRIPTION OF THE DRAWINGS

The following description will provide details of preferred embodiments with reference to the following figures wherein:

FIG. 4 is a diagram that illustrates a method flowchart that depicts updating the object model data associated with at least one interface element, in accordance with an embodiment of the disclosure;

DETAILED DESCRIPTION

Figure 1:
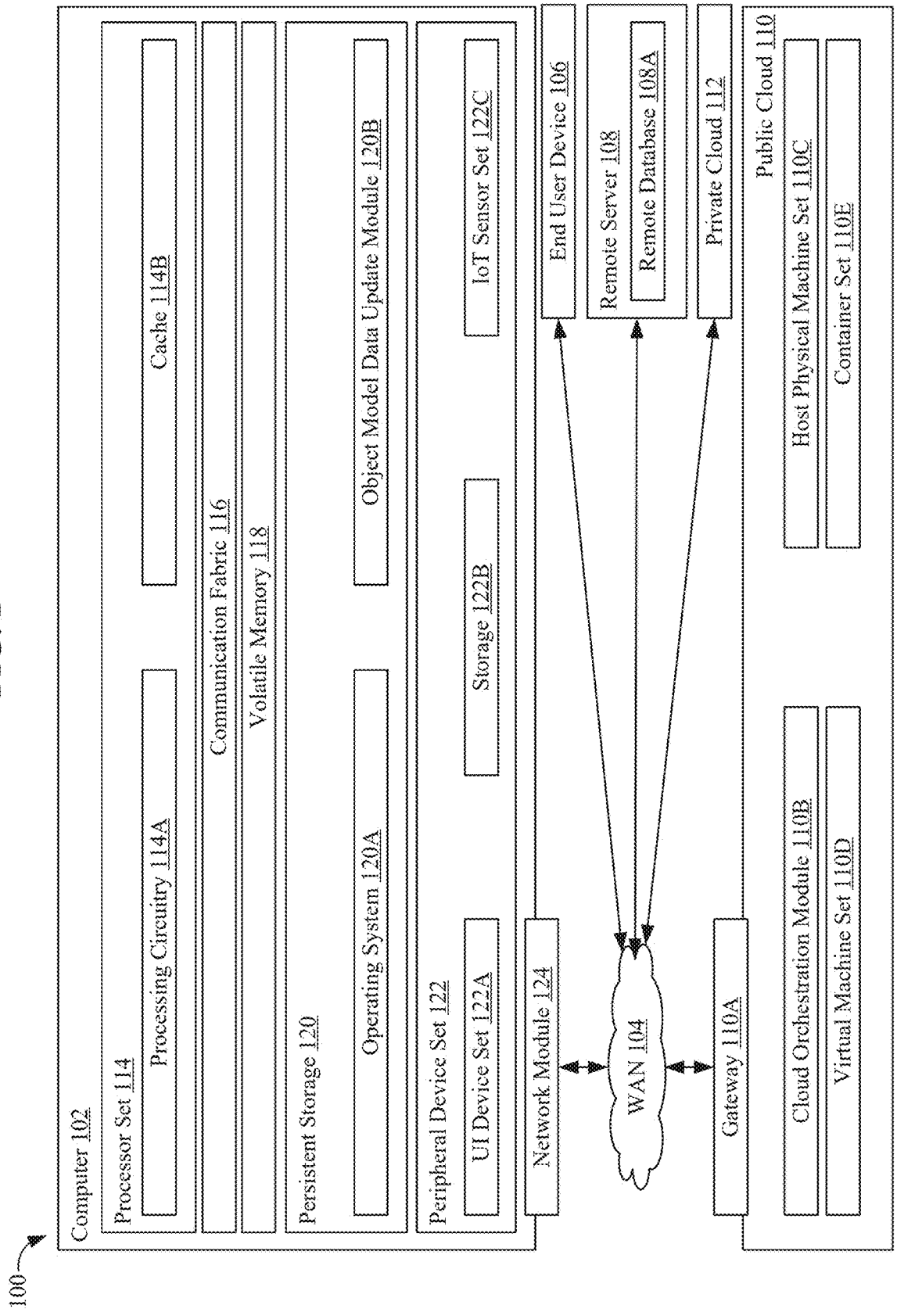
FIG. 1 is a diagram that illustrates a computing environment for updating object model data of interface elements based on emission scores, in accordance with an embodiment of the disclosure.

In today's digital landscape, users are unaware of the environmental impact associated with their online activities, for example, while using management applications, e-commerce applications, social media applications, etc. As users interact with various interface elements such as images, videos, buttons, and filters. The users unconsciously contribute to carbon emissions through data consumption and energy usage. This lack of awareness may hinder efforts to promote sustainable practices and make informed choices, leading to a growing carbon footprint associated with everyday digital interactions.

Furthermore, existing applications may be unable to assess user behavior dynamically, leading to a one-size-fits-all approach that does not account for individual emission patterns. Without personalized insights, users may continue engaging with high-emission content, such as high-quality video, intensive user interface, etc. without realizing the cumulative impact of their actions. This creates a gap in user engagement and sustainable behavior, as users are not provided with the feedback to make eco-friendly choices in real-time.

The disclosed system addresses these challenges by tracking user interactions within an application and assessing the associated carbon emissions. By collecting interaction data and generating a user emission score, the system effectively quantifies the environmental impact of individual user sessions. This allows for the identification of user clusters based on emission scores, enabling the application to adapt its responses and recommendations to specific user behaviors.

By updating the Document Object Model (DOM) associated with interface elements based on emission scores of clusters of users, the disclosed system not only enhances user awareness but also encourages more sustainable practices. For example, if a user is contributing to high emissions through their interactions, the application may modify visual elements to highlight eco-friendly alternatives or reduce data consumption. This adaptive approach not only promotes responsible user behavior but also promotes a culture of sustainability within digital platforms, ultimately reducing the overall carbon footprint associated with online activities.

According to an embodiment of the disclosure, a computer-implemented method for updating of object model data of interface elements based on emission scores of users is described. The computer-implemented method includes receiving, by a computer, interaction data associated with an interaction session between a specific user and one or more interface elements of an operation of an application. The computer implemented method further includes generating, by the computer, a user emission score associated with the interaction session of the specific user based on the first interaction data. The computer implemented method further includes identifying, by the computer, a first cluster from a plurality of clusters for the specific user based on the user emission score and cluster data. The cluster data is associated with each cluster of the plurality of clusters. The computer implemented method further includes generating, by the computer, a cluster emission score associated with the first cluster based on the user emission score and the cluster data associated with the first cluster. The computer implemented method further includes receiving, by the computer, object model data associated with each interface element of the one or more interface elements. The computer implemented method further includes updating, by the computer, the object model data associated with at least one interface element of the one or more interface elements based on the cluster emission score. The computer implemented method further includes outputting, by the computer, the updated object model data.

In various embodiments of the disclosure, the computer implemented method further includes comparing, by the computer, the user emission score with a plurality of thresholds. Each threshold of the plurality of thresholds corresponds to a respective cluster of the plurality of clusters. The computer implemented method further includes determining, by the computer, the user emission score is one of equal to, or greater than a first threshold of the plurality of thresholds. The first threshold is associated with the first cluster. The computer implemented method further includes identifying, by the computer, the first cluster from the plurality of clusters for the specific user based on the determining.

In various embodiments of the disclosure, the computer implemented method further includes rendering, by the computer, the at least one interface element of the one or more interface elements on a user device based on the updated object model data. The computer implemented method further includes performing, by the computer, the operation based on the rendering.

In various embodiments of the disclosure, the computer implemented method further includes rendering, by the computer, the at least one interface element concurrently with the interaction session based on the updated object model data.

In various embodiments of the disclosure, the computer implemented method further includes obtaining, by the computer, second interaction data associated with the interaction session. The second interaction data is associated with an interaction between the user and the at least one interface element. The at least one interface element is updated based on the updated object model data. The computer implemented method further includes dynamically updating, by the computer, the user emission score based on the second interaction data. The computer implemented method further includes determining, by the computer, the updated user emission score is one of equal to, or greater than a second threshold. The second threshold is associated with a second cluster of the plurality of clusters. The computer implemented method further includes reassigning, by the computer, the specific user from the first cluster to the second cluster from the plurality of clusters based on the determining.

In various embodiments of the disclosure, the computer implemented method further includes updating, by the computer, a user interface associated with the operation of the application. The updating of the user interface is based on the updated object model data. The computer implemented method further includes rendering, by the computer, the updated user interface.

In various embodiments of the disclosure, the computer implemented method further includes receiving, by the computer, emission value data associated with each interface element of the one or more interface elements. The computer implemented method further includes generating, by the computer, the user emission score based on the emission value data and the first interaction data.

In various embodiments of the disclosure, the computer implemented method further includes determining, by the computer, an element emission score associated with each interface element of the one or more interface elements based on the first interaction data and the emission value data. The computer implemented method further includes identifying, by the computer, the at least one interface element of the one or more interface elements based on the element emission score. The element emission score of the at least one interface element is greater than an emission threshold. The computer implemented method further includes updating, by the computer, the object model data associated with the identified at least one interface element based on the cluster data associated with the first cluster.

In various embodiments of the disclosure, a first size associated with the updated object model data of the at least one interface element is less than a second size associated with the object model data of the at least one interface element.

In various embodiments of the disclosure, the operation of the application is associated with a plurality of interface elements. The user interacts with the one or more interface elements of the plurality of interface elements in the interaction session. The computer implemented method further includes receiving, by the computer from the user, a user input associated with the plurality of the interface elements. The computer implemented method further includes updating, by the computer, the object model data associated with the at least one interface element of the one or more interface elements based on the user input.

In various embodiments of the disclosure, the first cluster comprises a plurality of users performing the operation of the application. The plurality of users is exclusive of the specific user. The computer implemented method further includes generating, by the computer, the cluster emission score associated with the first cluster based on the user emission score and the plurality of user emission scores. The cluster data comprises the plurality of user emission scores associated with the plurality of users.

In various embodiments of the disclosure, the computer implemented method further includes training, by the computer, a first artificial intelligence (AI) model based on historical interaction data. The historical interaction data is associated with a plurality of training interaction sessions between a plurality of training users and the operation of the application. The computer implemented method further includes applying, by the computer, the trained first AI model on the user emission score and the cluster data. The computer implemented method further includes identifying, by the computer, the first cluster from the plurality of clusters for the specific user based on the application. The computer implemented method further includes grouping, by the computer, the specific user within the first cluster based on the identification.

According to one or more embodiments of the disclosure, a computer system for updating of object model data of interface elements based on emission scores is disclosed.

The computer system includes a processor set, one or more computer-readable storage media, and program instructions stored on the one or more computer-readable storage media, the program instructions executable by the processor set to cause the processor set to receive interaction data associated with an interaction session between a specific user and one or more interface elements of an operation of an application. The program instructions cause the processor set to generate a user emission score associated with the interaction session of the specific user based on the first interaction data. The program instructions cause the processor set to identify a first cluster from a plurality of clusters for the specific user based on the user emission score and cluster data. The cluster data is associated with each cluster of the plurality of clusters. The program instructions cause the processor set to generate a cluster emission score associated with the first cluster based on the user emission score and the cluster data associated with the first cluster. The program instructions cause the processor set to receive object model data associated with each interface element of the one or more interface elements. The program instructions cause the processor set to update the object model data associated with at least one interface element of the one or more interface elements based on the cluster emission score. The program instructions cause the processor set to render the at least one interface element of the one or more interface elements on a user device based on the updated object model data. The at least one interface element is rendered concurrently with the interaction session.

In various embodiments of the disclosure, the program instructions cause the processor set to compare the user emission score with a plurality of thresholds. Each threshold of the plurality of thresholds corresponds to a respective cluster of the plurality of clusters. The program instructions cause the processor set to determine the user emission score is one of equal to or greater than a first threshold of the plurality of thresholds. The first threshold is associated with the first cluster. The program instructions cause the processor set to identify the first cluster from the plurality of clusters for the specific user based on the determination.

In various embodiments of the disclosure, the program instructions cause the processor set to obtain second interaction data associated with the interaction session. The second interaction data is associated with an interaction between the user and the at least one interface element. The at least one interface element is updated based on the updated object model data. The program instructions cause the processor set to dynamically update the user emission score based on the second interaction data. The program instructions cause the processor set to determine the updated user emission score is one of equal to, or greater than a second threshold. The second threshold is associated with a second cluster of the plurality of clusters. The program instructions cause the processor set to reassign the specific user from the first cluster to the second cluster from the plurality of clusters based on the determining.

In various embodiments of the disclosure, the program instructions cause the processor set to update a user interface associated with the operation of the application. The updating of the user interface is based on the updated object model data. The program instructions cause the processor set to render the updated user interface on the user device.

In various embodiments of the disclosure, the program instructions cause the processor set to receive emission value data associated with each interface element of the one or more interface elements. The program instructions cause the processor set to generate the user emission score based on the emission value data and the interaction data.

In various embodiments of the disclosure, the program instructions cause the processor set to determine an element emission score associated with each interface element of the one or more interface elements based on the first interaction data and the emission value data. The program instructions cause the processor set to identify the at least one interface element of the one or more interface elements based on the element emission score. The element emission score of the at least one interface element is greater than an emission threshold. The program instructions cause the processor set to update the object model data associated with the identified at least one interface element based on the cluster data associated with the first cluster.

According to one or more embodiments of the disclosure, a computer program product for updating of object model data of interface elements based on emission scores is disclosed. The computer program product includes one or more computer-readable storage media and program instructions stored on the one or more computer-readable storage media to perform operations. The operations include receiving interaction data associated with an interaction session between a specific user and one or more interface elements of an operation of an application. The operations further include generating a user emission score associated with the interaction session of the specific user based on the first interaction data. The operations further include identifying a first cluster from a plurality of clusters for the specific user based on the user emission score and cluster data. The cluster data is associated with each cluster of the plurality of clusters. The operations further include generating a cluster emission score associated with the first cluster based on the user emission score and the cluster data associated with the first cluster. The operations further include receiving object model data associated with each interface element of the one or more interface elements. The operations further include updating the object model data associated with at least one interface element of the one or more interface elements based on the cluster emission score. The operations further include outputting the updated object model data.

In various embodiments of the disclosure, the operations further include rendering the at least one interface element of the one or more interface elements on a user device concurrently with the interaction session based on the updated object model data. The operations further include performing the operation based on the rendering.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a diagram that illustrates a computing environment for updating object model data based on emission scores of users, in accordance with an embodiment of the disclosure. With reference to FIG. 1, there is shown a computing environment 100 that contains an example of an environment for execution of at least some of the computer code involved in performing the methods, such as an object model data update module 120B. In addition to the object model data update module 120B, computing environment 100 includes, for example, a computer 102, a wide area network (WAN) 104, an end user device (EUD) 106, a remote server 108, a public cloud 110, and a private cloud 112. In this embodiment of the disclosure, the computer 102 includes a processor set 114 (including a processing circuitry 114A and a cache 114B), a communication fabric 116, a volatile memory 118, a persistent storage 120 (including an operating system 120A and the object model data update module 120B, as identified above), a peripheral device set 122 (including a user interface (UI) device set 122A, a storage 122B, and an Internet of Things (IoT) sensor set 122C), and a network module 124. The remote server 108 includes a remote database 108A. The public cloud 110 includes a gateway 110A, a cloud orchestration module 110B, a host physical machine set 110C, a virtual machine set 110D, and a container set 110E.

The computer 102 may take the form of a desktop computer, a laptop computer, a tablet computer, a smartphone, a smartwatch or other wearable computer, a mainframe computer, a quantum computer, or any other form of a computer or a mobile device now known or to be developed in the future that is capable of running a program, accessing a network or querying a database, such as a remote database 108A As is well understood in the art of computer technology, and depending upon the technology, the performance of a computer-implemented method may be distributed among multiple computers and/or between multiple locations. On the other hand, in this presentation of the computing environment 100, detailed discussion is focused on a single computer, specifically the computer 102, to keep the presentation as simple as possible. The computer 102 may be located in a cloud, even though it is not shown in a cloud in FIG. 1. On the other hand, computer 102 is not required to be in a cloud except to any extent as may be affirmatively indicated.

The processor set 114 includes one, or more, computer processors of any type now known or to be developed in the future. The processing circuitry 114A may be distributed over multiple packages, for example, multiple, coordinated integrated circuit chips. The processing circuitry 114A may implement multiple processor threads and/or multiple processor cores. The cache 114B may be memory that is located in the processor chip package(s) and is typically used for data or code that should be available for rapid access by the threads or cores running on the processor set 114. Cache memories are typically organized into multiple levels depending upon relative proximity to the processing circuitry 114A. Alternatively, some, or all, of the cache 114B for the processor set 114 may be located "off-chip." In some computing environments, the processor set 114 may be designed for working with qubits and performing quantum computing.

Computer readable program instructions are typically loaded onto the computer 102 to cause a series of operations to be performed by the processor set 114 of the computer 102 and thereby effect a computer-implemented method, such that the instructions thus executed will instantiate the methods specified in flowcharts and/or narrative descriptions of computer-implemented methods included in this document (collectively referred to as "the methods"). These computer-readable program instructions are stored in various types of computer-readable storage media, such as the cache 114B and the other storage media discussed below. The program instructions, and associated data, are accessed by the processor set 114 to control and direct the performance of the methods. In computing environment 100, at least some of the instructions for performing the methods may be stored in the dynamic modification of the object model data update module 120B in persistent storage 120.

The communication fabric 116 is the signal conduction path that allows the various components of computer 102 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

The volatile memory 118 is any type of volatile memory now known or to be developed in the future. Examples include dynamic type random access memory (RAM) or static type RAM. Typically, the volatile memory 118 is characterized by a random access, but this is not required unless affirmatively indicated. In the computer 102, the volatile memory 118 is located in a single package and is internal to computer 102, but alternatively or additionally, the volatile memory 118 may be distributed over multiple packages and/or located externally with respect to computer 102.

The persistent storage 120 is any form of non-volatile storage for computers that is now known or to be developed in the future. The non-volatility of this storage means that the stored data is maintained regardless of whether power is being supplied to computer 102 and/or directly to the persistent storage 120. The persistent storage 120 may be a read-only memory (ROM), but typically at least a portion of the persistent storage 120 allows writing of data, deletion of data, and re-writing of data. Some familiar forms of the persistent storage 120 include magnetic disks and solid-state storage devices. The operating system 120A may take several forms, such as various known proprietary operating systems or open-source Portable Operating System Interface-type operating systems that employ a kernel. The code included in the object model data update module 120B typically includes at least some of the computer code involved in performing the disclosed methods.

The peripheral device set 122 includes the set of peripheral devices of computer 102. Data communication connections between the peripheral devices and the other components of computer 102 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments of the disclosure, the UI device set 122A may include components such as a display screen, speaker, microphone, wearable devices (such as goggles and smartwatches), keyboard, mouse, printer, touchpad, game controllers, and haptic devices. The storage 122B is external storage, such as an external hard drive, or insertable storage, such as an SD card. The storage 122B may be persistent and/or volatile. In some embodiments of the disclosure, storage 122B may take the form of a quantum computing storage device for storing data in the form of qubits. In embodiments of the disclosure where computer 102 is required to have a large amount of storage (for example, where computer 102 locally stores and manages a large database) then this storage may be provided by peripheral storage devices designed for storing very large amounts of data, such as a storage area network (SAN) that is shared by multiple, geographically distributed computers. The IoT sensor set 122C is made up of sensors that can be used in Internet of Things applications. For example, one sensor may be a thermometer, and other sensor may be a motion detector.

The network module 124 is the collection of computer software, hardware, and firmware that allows computer 102 to communicate with other computers through WAN 104. The network module 124 may include hardware, such as modems or Wi-Fi signal transceivers, software for packetizing and/or de-packetizing data for communication network transmission, and/or web browser software for communicating data over the internet. In some embodiments of the disclosure, network control functions, and network forwarding functions of the network module 124 are performed on the same physical hardware device. In an embodiment of the disclosure (for example, embodiments that utilize software-defined networking (SDN)), the control functions and the forwarding functions of the network module 124 are performed on physically separate devices, such that the control functions manage several different network hardware devices. Computer-readable program instructions for performing the disclosed methods can typically be downloaded to computer 102 from an external computer or external storage device through a network adapter card or network interface included in the network module 124.

The WAN 104 is any wide area network (for example, the internet) capable of communicating computer data over non-local distances by any technology for communicating computer data, now known or to be developed in the future. In some embodiments of the disclosure, the WAN 104 may be replaced and/or supplemented by local area networks (LANs) designed to communicate data between devices located in a local area, such as a Wi-Fi network. The WAN 104 and/or LANs typically include computer hardware such as copper transmission cables, optical transmission fibers, wireless transmission, routers, firewalls, switches, gateway computers, and edge servers.

The EUD 106 is any computer system that is used and controlled by an end user (for example, a customer of an enterprise that operates computer 102) and may take any of the forms discussed above in connection with computer 102. The EUD 106 typically receives helpful and useful data from the operations of computer 102. For example, in a hypothetical case where computer 102 is designed to provide a recommendation to an end user, this recommendation would typically be communicated from the network module 124 of computer 102 through WAN 104 to EUD 106. In this way, the EUD 106 can display, or otherwise present recommendations to an end user. In some embodiments of the disclosure, EUD 106 may be a client device, such as a thin client, heavy client, mainframe computer, desktop computer, and so on.

The remote server 108 is any computer system that serves at least some data and/or functionality to the computer 102. The remote server 108 may be controlled and used by the same entity that operates the computer 102. The remote server 108 represents the machine(s) that collect and store helpful and useful data for use by other computers, such as the computer 102. For example, in a hypothetical case where the computer 102 is designed and programmed to provide a recommendation based on historical data, then this historical data may be provided to the computer 102 from the remote database 108A of the remote server 108.

The public cloud 110 is any computer system available for use by multiple entities that provides on-demand availability of computer system resources and/or other computer capabilities, especially data storage (cloud storage) and computing power, without direct active management by the user. Cloud computing typically leverages the sharing of resources to achieve coherence and economies of scale. The direct and active management of the computing resources of the public cloud 110 is performed by the computer hardware and/or software of the cloud orchestration module 110B. The computing resources provided by the public cloud 110 are typically implemented by virtual computing environments that run on various computers making up the computers of the host physical machine set 110C, which is the universe of physical computers in and/or available to the public cloud 110. The virtual computing environments (VCEs) typically take the form of virtual machines from the virtual machine set 110D and/or containers from the container set 110E. It is understood that these VCEs may be stored as images and may be transferred among and between the various physical machine hosts, either as images or after the instantiation of the VCE. The cloud orchestration module 110B manages the transfer and storage of images, deploys new instantiations of VCEs, and manages active instantiations of VCE deployments. The gateway 110A is the collection of computer software, hardware, and firmware that allows public cloud 110 to communicate through WAN 104.

Some further explanation of virtualized computing environments (VCEs) will now be provided. VCEs can be stored as "images". A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

The private cloud 112 is similar to public cloud 110, except that the computing resources are only available for use by a single enterprise. While the private cloud 112 is depicted as being in communication with the WAN 104, in various embodiments of the disclosure, a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment of the disclosure, the public cloud 110 and the private cloud 112 are both part of a larger hybrid cloud.

Figure 2:
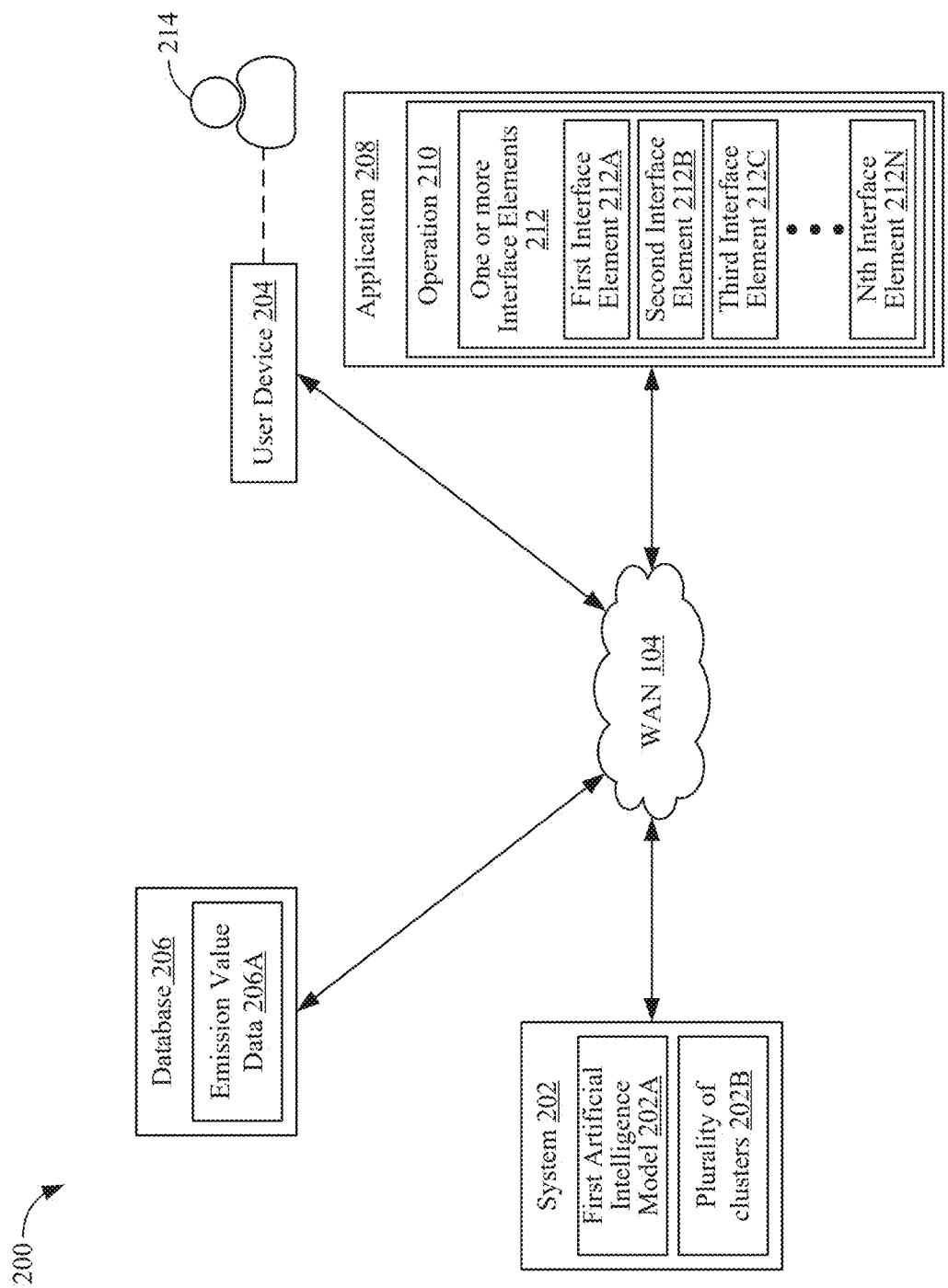
FIG. 2 is a diagram that illustrates an environment in which a system for updating object model data of interface elements based on emission scores is implemented, in accordance with an embodiment of the disclosure.

FIG. 2 is a diagram that illustrates an environment for updating object model data based on emission scores of users, in accordance with an embodiment of the disclosure. FIG. 2 is explained in conjunction with elements from FIG. 1. With reference to FIG. 2, there is shown a diagram of a network environment 200. The network environment 200 includes a system 202, a user device 204, and an application 208. There is further shown an operation 210 being executed associated with the application 208. The operation 210 further includes one or more interface elements 212. The one or more interface elements 212 include a first interface element 212A, a second interface element 212B, a third interface element 212C, up to an Nth interface element 212N. The system 202 further includes a first artificial intelligence (AI) model 202A, and a plurality of clusters 202B. The network environment 200 further includes a database 206. The database 206 may store emission value data 206A. The network environment 200 further includes the WAN 104 of FIG. 1.

The system 202 may include suitable logic, circuitry, interfaces, and/or code that may be configured for updating object model data of interface elements based on emission scores. The system 202 is configured to dynamically update the object model data for interface elements by integrating the emission scores. By evaluating the carbon impact of various actions and interactions, the system 202 ensures that the displayed information reflects real-time environmental metrics. When emission scores change due to the behavior of a specific user 214, the system 202 automatically adjusts the relevant one or more interface elements 212, enhancing awareness of the specific user 214 of their environmental footprint. The behavior may indicate, for example, multiple interactions of the specific user 214 with at least one element of the one or more interface elements 212 with a high-emission value. In an exemplary embodiment, the high-emission value may correspond to an emission value greater than a first emission level, such as greater than 10 grams of carbon dioxide equivalent (g $CO_2e$). This approach promotes sustainable practices by providing users with actionable insights and encouraging them to make informed decisions, ultimately fostering a more eco-conscious digital experience.

In an embodiment, the computer system 202 (hereinafter referred to as system 202) includes the first artificial intelligence (AI) model 202A. The first AI model 202A may be an algorithm designed to analyze data, learn patterns, and make predictions or decisions based on historical and current data. The first AI model 202A may be implemented using, for example, linear regression techniques, neural networks, etc. The first AI model 202A may be configured to process natural language or recognize images. By training the first AI model 202A on large datasets, the system 202 improves the accuracy and efficiency of the first AI model 202A over time, enabling applications in various fields such as healthcare, finance, and entertainment.

In an embodiment, the system 202 trains the first AI model 202A on historical interaction data associated with a plurality of training interaction sessions. The system 202 utilizes the first AI model 202A to identify at least one cluster from the plurality of clusters 202B for the specific user 214 based on the user emission score associated with the specific user 214 and the cluster data associated with the plurality of clusters 202B. Each cluster from the plurality of clusters 202B includes a plurality of users that have similar user emission scores. When the specific user 214 accesses the application 208, the system 202, by using the first AI model 202A assigns the specific user 214 to the cluster of the plurality of clusters 202B. In an exemplary embodiment, the cluster may correspond to the first cluster.

In an embodiment, the application 208 may be a software program designed to facilitate user interactions while performing specific tasks, such as browsing, purchasing, project management, customer management, or content consumption. Examples of the application 208 may include, but are not limited to, e-commerce platforms, where the specific user 214 may perform the operation 210, such as exploring products and making purchases, social media applications that enable users to share and engage with content, and educational tools that provide interactive learning experiences. Additionally, streaming services allow users to access multimedia content like movies and music, while productivity applications assist the specific user 214 in creating and managing projects, documents, spreadsheets, and presentations. Each of these applications may leverage the disclosed system, i.e., the system 202, to enhance user engagement, optimize resource consumption, and promote environmentally responsible behavior through real-time assessments of user interactions and corresponding emissions.

In an embodiment, the database 206 is an organized collection of structured information that allows for efficient storage, retrieval, and management of data. In an exemplary embodiment, the database 206 stores emission value data 206A associated with each interface element of the one or more interface elements 212 within the application 208. The various types of databases may be, for example, but not limited, relational databases, which organize data into tables with predefined relationships; No-Structured Query Language (NoSQL) databases, which store unstructured or semi-structured data and allow for flexible schema design; and graph databases, which focus on the relationships between data points and are particularly useful for complex networks. Additionally, there are object-oriented databases that store data in the form of objects, aligning with object-oriented programming principles. By utilizing a suitable database type, the system 202 may efficiently manage the emission value data 206A, enabling quick access and analysis to support user interactions and promote sustainability within the application 208.

The user device 204 may include suitable logic, circuitry, interfaces, and/or code that may be configured to render the at least one interface element of the one or more interface elements 212. Examples of the user device 204 may include, but are not limited to, a computing device, a server, a computer work-station, a smartphone, a desktop, a laptop, an Augmented Reality (AR) device, a Virtual Reality (VR) device, a cellular phone, a mobile phone, a mainframe machine, a gaming device, a consumer electronic (CE) device, a head-mounted device, a projection-based system, and/or any other device with computer vision display capabilities.

In operation, the specific user 214 accesses the application 208 on the user device 204. The application 208 may be, for example, but is not limited to, an e-commerce application, a productivity application, a social media application, an entertainment application, and so forth. Upon accessing the application 208, the specific user 214 performs the operation 210 associated with the application 208 on the user device 204. In a scenario, if the application 208 corresponds to the e-commerce application, the operation 210 associated with the application 208 may correspond to placing an order for a product on the application 208. In an embodiment, the operation 210 is performed by the specific user 214 associated with the user device 204. Further, while the specific user 214 is performing the operation 210, the specific user 214 interacts with one or more interface elements 212 associated with the operation 210. The one or more interface elements 212 may be user interface elements rendered on the user device 204 that may be utilized to successfully execute the operation 210 associated with the application 208. The one or more interface elements 212 may be, for example, but not limited to, one or more buttons, one or more text fields, one or more drop-down menus, checkboxes, one or more sliders, navigation bars, icons, images, and videos.

Further, the system 202 is configured to receive interaction data associated with an interaction session between the specific user 214 and the one or more interface elements 212 of the operation 210 of the application 208. In an embodiment, data associated with the interaction of the specific user 214 with the one or more interface elements 212 while performing the operation 210 corresponds to the interaction data. In an exemplary embodiment, if the specific user 214 starts to interact with the one or more interface elements 212 associated with the operation 210 at a first timestamp "T1" and ends interacting with the one or more interface elements associated with the operation 210 at a second timestamp "T2", then the duration of interaction between the specific user 214 and the one or more interface elements from the first timestamp "T1" to second timestamp "T2" corresponds to the interaction session. Further, the data, such as clicking on an interface element, a count of clicks on the one or more interface elements, an amount of time of the interaction sessions, etc. associated with the interaction session corresponds to the interaction data. The interaction data is indicative of the one or more interface elements 212 that the specific user 214 interacted with during the interaction session. In a scenario, the specific user 214 interacted with the first interface element 212A, the second interface element 212B, and the third interface element 212C during the interaction session. In this case, the system 202 receives the interaction data indicating that the specific user 214 interacted with the first interface element 212A, the second interface element 212B, and the third interface element 212C during the interaction session.

In an embodiment, the system 202 is configured to generate a user emission score associated with the interaction session of the specific user 214 based on the first interaction data. In an exemplary embodiment, as the specific user 214 interacts with the one or more interface elements 212, while performing the operation 210 in the application 208, each interaction between the specific user 214 and the one or more interface elements 212 generates carbon emissions based on energy consumed by the user device 204 and other computing entities, such as servers, data centers, etc. hosting the application. For instance, clicking the one or more buttons, browsing over the Internet, streaming video content, typing in the one or more text fields, or navigating through menus may all require energy usage, and thus may cause carbon emissions. The system 202 receives the interaction data associated with the interaction session and generates the user emission score, which reflects the overall environmental impact of the interaction session. A higher user emission score indicates greater carbon emissions due to more intensive interactions, while a lower score indicates more efficient usage. For example, a user emission score may be high when the user emission score is greater than a first emission level, such as greater than 10 g $CO_2$e. Alternatively, a user emission score may be low when the user emission score is lesser than a second emission level, such as lesser than 5 g $CO_2$e. Moreover, a user emission score may be moderate when the user emission score is greater than the second emission level and lesser than the first emission level, such as greater than 5 g $CO_2$e and lesser than 10 g $CO_2$e.

In an embodiment, the system 202 further identifies a first cluster from a plurality of clusters 202B for the specific user 214 based on the user emission score and cluster data. The cluster data is associated with each cluster of the plurality of clusters. In an embodiment, the cluster data includes a plurality of user emission scores associated with the plurality of users of each cluster of the plurality of clusters 202B. For example, the cluster data associated with the first cluster of the plurality of clusters 202B includes the user emission scores of each user present in the first cluster. Similarly, the cluster data associated with the second cluster and the third cluster of the plurality of clusters 202B includes user emission scores of each user of the plurality of users associated with the second cluster and the third cluster respectively. Each cluster of the plurality of clusters includes the plurality of users. Further, each cluster of the plurality of clusters indicates a group of users characterized by varying carbon emission scores.

In an embodiment, the system 202 is further configured to generate a cluster emission score associated with the first cluster based on the user emission score and the cluster data associated with the first cluster. The cluster emission score associated with the first cluster is generated by analyzing the individual user emission scores of each of the plurality of users within the first cluster of the plurality of clusters 202B. By aggregating the individual user emission scores, the system 202 derives an average score (referred to as, a cluster emission score) associated with the first cluster. The cluster emission score highlights collective carbon emissions associated with the plurality of users within the first cluster.

In an embodiment, the system 202 is further configured to receive object model data associated with each interface element of the one or more interface elements. The object model data associated with each interface element of the one or more interface elements is indicative of data associated with each of the one or more interface elements that are rendered on the user device 204. For example, if the first interface element 212A corresponds to the text field and the second interface element 212B corresponds to a submit button, then the object model data of the first interface element 212A is indicative of multiple attributes associated with the first interface element 212A and the object model data of the second interface element 212B is indicative of multiple attributes associated with the second interface element 212B. The multiple attributes may be, for example, but are not limited to, position of the one or more interface elements 212, color of the one or more interface elements 212, size of the one or more interface elements 212, and the font of the one or more interface elements 212.

Further, the system 202 is configured to update the object model data associated with at least one interface element of the one or more interface elements based on the cluster emission score. For example, the system 202 identifies that the first cluster of the plurality of clusters 202B is suitable for the specific user 214 based on the user emission score associated with the specific user 214. In an example, the first cluster includes a plurality of users with high user emission scores, then the system 202 updates the object model data associated with at least one interface element of the one or more interface elements based on the cluster emission score of the first cluster. In an exemplary embodiment, the user emission score may be considered to be high when the user emission score is for example, equal to or greater than 75 g $CO_2$e. The user emission score may be considered to be moderate when the user emission score is, for example, equal to or greater than 51 g $CO_2$e and less than 75 g $CO_2$e. In addition, the user emission score may be considered to be low when the user emission score is, for example, less than 50 g $CO_2$e.

In an embodiment, the system 202 is configured to output the updated object model data. In an exemplary embodiment, if the system 202 determines that the interaction of the specific user 214 with the first interface element 212A is causing high carbon emission, then the system 202 updates the object model data associated with the first interface element 212A. An intense interaction of the specific user 214 with the first interface element 212A (that may have the high emission value data 206A) may result in the high carbon emission. In an exemplary embodiment, the high emission value data 206A may be for example, but not limited to, 5 g $CO_2$e, moderate emission value data 206A may be for example, but not limited to, 3 g $CO_2$e, and low emission value data 206A may be for example, but not limited to, 1 g $CO_2$e. For example, if the first interface element 212A corresponds to the text field and default size in the object model of the first interface element 212A is "16". Then the system 202 updates the object model data and changes the default size to, for example, "12". Updating the object model data of the first interface element 212A may bring down the carbon emission making the interaction session more eco-friendly. Similarly, the system 202 may update the object model data of each interface element of the one or more interface element 212 whose element emission score is greater than an emission threshold.

Figure 3:
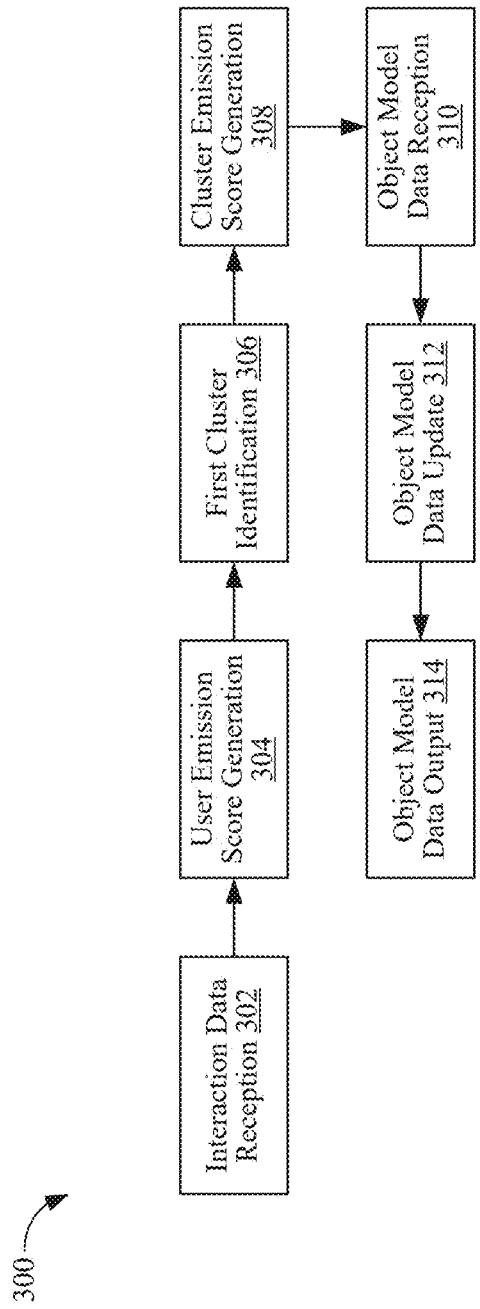
FIG. 3 is a diagram that illustrates one or more operations performed by the system for updating the object model data based on emission scores, in accordance with an embodiment of the disclosure.

FIG. 3 is a diagram 300 that illustrates one or more operations performed by the system 202 for updating the object model data based on emission scores, in accordance with an embodiment of the disclosure. FIG. 3 is explained in conjunction with elements from FIG. 1, and FIG. 2. With reference to FIG. 3, the operations may start at 302.

At 302, an interaction data reception operation is executed. In an embodiment, the system 202 is configured to execute the interaction data reception operation. In the interaction data reception operation, the system 202 is configured to receive the first interaction data associated with an interaction session between the specific user 214 and the one or more interface elements 212 of the operation 210 of the application 208.

In an exemplary embodiment, the system 202 is configured to receive the first interaction data related to an ongoing session (such as the interaction session) between the specific user 214 and the one or more interface elements 212 of the application 208. In an exemplary scenario, the specific user 214 is using the application 208 which corresponds to a website that is utilized to track and reduce carbon emissions. During this interaction session, the specific user 214 interacts with one or more interface elements 212, such as, but not limited to, the buttons for logging activities, the sliders for adjusting their daily carbon targets, and the graphs that display the progress of the specific user 214 over time.

Further, as the specific user 214 interacts with each of the one or more interface elements 212, such as by clicking the button to record a new activity or adjusting the slider to set a new target. The system 202 is configured to receive real-time data associated with the interaction of the specific user 214 with the one or more interface elements 212 to perform the operation 210 during the interaction session.

At 304, a user emission score generation operation is executed. In an embodiment, the system 202 is configured to execute the user emission score generation operation. In the user emission score generation operation, the system 202 is configured to generate the user emission score associated with the interaction session of the specific user 214 based on the first interaction data.

In an exemplary embodiment, the system 202 executes the user emission score generation operation that utilizes the first interaction data collected in real-time during the interaction session. The system 202 is further configured to analyze the first interaction data to generate the user emission score that is indicative of the environmental impact associated with the interaction of the specific user 214 with the one or more interface elements 212 while performing the operation 210 within the application 208.

In an exemplary scenario, the specific user 214 is using the application 208 that corresponds to the e-commerce application. The specific user 214 is performing the operation 210 which corresponds to ordering a product, such as a pair of shoes. Pursuant to the present example, during the interaction session, the specific user 214 engages with one or more interface elements 212 associated with the operation 210, including clicking the buttons to view product details, scrolling through customer reviews, and viewing images of the shoes.

Further, as the specific user 214 interacts with the one or more interface elements 212, the system 202 captures the first interaction data, including timestamps for each action, such as each click and/or input, and the one or more interface elements 212 involved in the execution of the operation 210. For example, the specific user 214 searches through a plurality of items to select a pair of shoes, views reviews, clicks a button to add the pair of shoes to the cart, and then selects a delivery option. The system 202 then accesses the database 206 that contains the emission value data 206A associated with each of the one or more interface elements 212.

In an embodiment, interaction with each interface element of the one or more interface elements 212 such as clicking to add the product to the cart, viewing images and/or videos, or reading the reviews have associated emission value data stored in the database. For example, clicking the button for adding a pair of shoes to the cart might contribute 2 grams of carbon di-oxide equivalent (g $CO_2e$), viewing the images of the pair of shoes may have emission value data of 4 g $CO_2e$, viewing the videos of the pair of shoes may have emission value data of 10 g $CO_2e$, and engaging with customer reviews have emission value data of 1 g $CO_2e$.

Further, the system 202 is configured to generate the user emission score associated with the interaction session or a part of the ongoing interaction session of the specific user 214. In an exemplary embodiment, considering that the specific user 214 performed each action only once, the user emission score may be (2+4+10+1=4) g $CO_2e$.

At 306, a first cluster identification operation is executed. In an embodiment, the system 202 is configured to execute the first cluster identification operation. In the first cluster identification operation, the system 202 is configured to identify the first cluster from the plurality of clusters 202B for the specific user 214 based on the user emission score and the cluster data. The cluster data is associated with each cluster of the plurality of clusters 202B. For example, once the system 202 generates the user emission score at 304, the system 202 accesses the plurality of clusters 202B, and each cluster of the plurality of clusters 202B is associated with a specific threshold score.

In an exemplary scenario, the system 202 utilizes the trained first AI model 202A to generate three clusters. The three clusters include a first cluster, a second cluster, and a third cluster. The first cluster includes a plurality of users with user emission scores ranging from 0 g $CO_2e$ to 50 g $CO_2e$. The first cluster may be characterized as low-emission users. Further, the second cluster covers another plurality of users with the user emission scores from 51 g $CO_2e$ to 75 g $CO_2e$, categorized as moderate-emission users. Moreover, the third cluster includes plurality of users with scores above 75 g $CO_2e$, characterized as high-emission users.

In this scenario, if the specific user 214 has the user emission score of 70 g $CO_2e$, the system 202 will reference the cluster data associated with each cluster of the plurality of cluster 202B to identify the cluster for the specific user 214. The system 202 will compare the user emission score of the specific user 214 with the plurality of thresholds for each of the plurality of clusters. As 70 g $CO_2e$ is within the range of the second cluster (51 g $CO_2e$ to 75 g $CO_2e$), the system 202 identifies that the specific user 214 should be assigned to the moderate-emission cluster. It may be noted that the first cluster being associated with low emissions and the third cluster being associated with high emissions is only exemplary and should not be construed as a limitation. In an alternate embodiment, the first cluster may correspond to the high-emission and may include users having high user emission scores, and the third cluster may correspond to the low-emission and may include users having low user emission scores. In addition, the generation of three clusters corresponding to high emissions, moderate emissions and low emissions is also exemplary. In alternate embodiments, any number, for example, 2, 4, 5, 10, etc. of clusters may be generated.

At 308, a cluster emission score generation operation is executed. In an embodiment, the system 202 is configured to execute the cluster emission score generation operation. In the cluster emission score generation operation, the system 202 is configured to generate the cluster emission score associated with the first cluster based on the user emission score and the cluster data associated with the first cluster of the plurality of clusters 202B. For example, the specific user 214 has been assigned to the appropriate cluster, the system 202 utilizes the user emission score, such as, but not limited to, 70 g $CO_2e$, and the cluster data associated with the first cluster.

For example, the first cluster represents high-emission users, defined as those with emission scores ranging from 51 g $CO_2e$ to 75 g $CO_2e$. The system 202 accesses the cluster data, which may include average emission scores, the total number of users within the cluster, and other relevant metrics that characterize the environmental impact of the plurality of users in the corresponding cluster.

Further, to generate the cluster emission score, the system 202 calculates the average user emission score for the plurality of users within the first cluster. In an exemplary embodiment, the cluster data includes that the average user emission score for the high-emission cluster is 65 g $CO_2e$, with a total of 10 users assigned in the first cluster. The system 202 then combines this average with the user emission score (say 70 g $CO_2e$) associated with the specific user 214 of 70 g $CO_2e$ to derive a new cluster emission score.

At 310, an object model data reception operation is executed. In an embodiment, the system 202 is configured to execute the object model data reception operation. In the object model data reception operation, the system 202 is configured to receive the object model data associated with each interface element of the one or more interface elements 212. The system 202 is configured to receive the object model data associated with each interface element of the one or more interface elements associated with the operation 210 within the application 208. For example, the system 202 collects the object model data corresponding to the Document Object Model (DOM) structure of each interface element of the one or more interface elements 212 within the application 208.

Further, as the specific user 214 interacts with at least one element of the one or more interface elements 212 of the operation 210 associated with the application 208. In an exemplary embodiment, the specific user 214 is browsing products on the e-commerce website, the one or more interface elements 212 may be, such as product listings, "Add to Cart" buttons, and filters. Further, the system 202 retrieves object model data that reflects the DOM structure of the one or more interface elements 212. This data includes details about the hierarchy, attributes, and behaviors associated with each interface element of the one or more interface elements 212.

For example, when the user clicks on a product image, the system 202 accesses the DOM structure data that indicates how the image is nested within the product card. This may include attributes such as the image source, alt text for accessibility, and event listeners that trigger the display of additional product details. Similarly, if the specific user 214 applies a filter to view only low-emission products, the system 202 captures the DOM data corresponding to the filter dropdown. This data would include information about the filter's options, its default state, and how it interacts with the product listings displayed on the page.

Further, when the specific user 214 clicks the "Add to Cart" button, the system 202 receives object model data that specifies its position within the DOM hierarchy, any relevant styles, and the specific function it performs when clicked (e.g., updating the cart total and calculating the associated carbon emissions).

At 312, an object model data update operation is executed. In an embodiment, the system 202 is configured to execute the object model data update operation. In the object model data reception operation, the system 202 is configured to update the object model data associated with at least the one interface of the one or more interface elements 212 based on the cluster emission data.

In an exemplary embodiment, if the system 202 determines that the specific user 214 is assigned to the cluster (say the first cluster) from the plurality of cluster 202B with a higher cluster emission score, it will identify which interface element of the one or more interface elements are contributing most to the carbon emissions of the specific user 214. For example, if the specific user 214 is browsing high-quality images of the products in the e-commerce application and the system determines that the high-resolution images, such as images with 1080 pixels resolution, or more are consuming significant data and energy, the system 202 updates the object model data for the interface element associated with the image of the product. The system 202 converts the high-resolution product images to lower-resolution images of the product, significantly reducing the carbon emission. For example, instead of displaying a 4K image that uses a substantial amount of data and energy, the system 202 converts it into a more energy-efficient 720-pixel image.

At 314, an object model data output operation is executed. In an embodiment, the system 202 is configured to execute the object model data output operation. In the object model data output operation, the system 202 is configured to output the updated object model data. In an embodiment, the system 202 is further configured to render the at least one interface element of the one or more interface elements on the user device 204 based on the updated object model data. For example, the system 202 will render the updated image of the product in 720p on the user device 204 based on the updated object model data. Further, the system 202 is configured to perform the operation 210 based on the rendering.

FIG. 4 is a diagram that illustrates a method flowchart 400 that depicts updating the object model data associated with at least one interface element, in accordance with an embodiment of the disclosure. FIG. 4 is explained in conjunction with elements from FIG. 1, FIG. 2, and FIG. 3.

At 402, the emission value data 206A associated with each interface element of the one or more interface elements 212 is received. In an exemplary embodiment, the system 202 receives the emission value data from the database 206. In an exemplary embodiment, the emission value data 206A associated with each interface element of the one or more interface elements 212 is indicative of the amount of carbon emitted while interacting with the corresponding interface element per interaction or in a time.

For example, if the specific user 214 interacts with the first interface element 212A of the one or more interface elements 212 while performing the operation 210 on the application 208, then the system 202 receives the emission value data 206A associated with the first interface element 212A from the database 206. The emission value data 206A associated with the first interface element 212A indicates the amount of carbon emitted as a result of interaction with the first interface element 212A. In an exemplary embodiment, the first interface element 212A corresponds to a product image on the e-commerce application. The system 202 processes and renders the product image on the user device 204. If the product image is of low resolution (e.g., 480 pixels or less), the system 202 consumes less energy to process and render the image as compared to if the product image is of high resolution (e.g., 1080 Pixels).

In an exemplary scenario, the emission value data 206A stored in the database 206 associated with a low-resolution product image corresponds to, for example, 5 grams of carbon dioxide equivalent (5 g $CO_2e$) and the emission value data 206A stored in the database 206 associated with high-resolution product image corresponds to, for example, 10 grams of $CO_2$ equivalent (10 g $CO_2e$). This indicates that if the specific user 214 interacts with the low-resolution product image, then the system 202 receives the emission value data 206A corresponding to 5 grams of $CO_2$ equivalent (g $CO_2e$). Further, if the specific user 214 interacts with the high-resolution product image, then the system 202 receives the emission value data 206A corresponding to 10 g $CO_2e$ from the database 206.

At 404, a user emission score is generated based on the emission value data 206A and the interaction data. In an exemplary embodiment, the interaction data received by the system 202 indicates that the specific user 214 interacted with the first interface element 212A and the second interface element 212B during the interaction session.

Further, the system 202 receives the emission value data 206A associated with the first interface element 212A and the emission value data 206A associated with the second interface element 212B. The emission value data 206A associated with the first interface element corresponds to 3 g $CO_2e$ per interaction and the emission value data 206A associated with the second interface element corresponds to 5 g $CO_2e$ per interaction. Further, the interaction data indicates that the specific user 214 interacted 5 times with the first interface element 212A during the interaction session and the specific user 214 interacted 2 times with the second interface element 212B during the interaction session. Further, the system 202 generates the user emission score based on the emission value data 206A and the interaction data. The user emission score corresponds to (3*5+5*2=25) g $CO_2e$.

At 406, the system 202 is configured to determine the element emission score associated with each interface element of the one or more interface elements 212 based on the first interaction data and the emission value data 206A. In an exemplary embodiment, as described in 404, the emission value data 206A associated with the first interface element 212A corresponds to 3 g $CO_2e$, and the emission value data 206A associated with the second interface element 212B corresponds to 5 g $CO_2e$. Further, the interaction data indicates that the specific user 214 interacts with the first interface element 212A for 5 seconds making the element emission score (3*5=15) g $CO_2e$.

Similarly, the interaction data indicates that the specific user 214 interacts with the second interface element 212B for 2 seconds and the emission value data 206A associated with the second interface element corresponds to 5 g $CO_2e$ making the element emission score associated with the second interface element 212B (5*2=10) g $CO_2e$.

At 408, the system 202 is further configured to identify at least one interface element of the one or more interface elements 212 based on element emission score. The element emission score associated with each interface element of the one or more interface elements corresponds to the amount of carbon emission caused when the specific user 214 interacts with the corresponding interface element during the interaction session. In an embodiment, the interface element is identified if the element emission score of the at least one interface element is greater than the emission threshold.

In an exemplary embodiment, if the emission threshold corresponds to, for example, but is not limited to, 20 g $CO_2e$, then the system 202 is configured to compare the element emission score of each interface element of the one or more interface elements 212 with the emission threshold. In an exemplary embodiment, the emission threshold indicates the allowable amount of the carbon emission associated with the interaction between the specific user 214 and the first interface element 212A of the one or more interface elements 212. In an exemplary scenario, the first interface element 212A corresponds to the high-resolution image, and the emission threshold associated with the first interface element 212A corresponds to 20 g $CO_2e$. Further, the emission value data 206A associated with the first interface element 212A corresponds to 5 g $CO_2e$ per interaction. The system 202 determines that the specific user 214 interacted with the first interface element 212A 5 times. Further, the system 202 determines that the element emission score corresponds to (5*5=25) g $CO_2e$. The system 202 further compares the element emission score of the first interface element 212A with the emission threshold. In the described exemplary scenario, the element emission score is greater than the emission threshold. Further, the system 202 identifies that the first interface element 212A is a high carbon emitting interface element of the one or more interface elements 212.

At 410, the system 202 is configured to update the object model data associated with the identified at least one interface element based on the cluster data associated with the first cluster of the plurality of clusters 202B. In an exemplary embodiment, the system 202 assigns the specific user 214 to the first cluster based on the user emission score associated with the specific user 214. Further, the system 202 identifies the at least one interface element of the one or more interface elements 212 based on the element emission score. For example, the identified interface element corresponds to the first interface element 212A. Further, the system 202 updates the object model data associated with the first interface element 212A. In an embodiment, a first size associated with the updated object model data associated with the first interface element 212A is less than a second size associated with the object model data associated with the first interface element 212A. For example, if the first interface element 212A corresponds to the high-resolution product image and the object model data associated with the first interface element 212A indicates that the second size associated with the first interface element 212A corresponds to, for example, 1080 pixels or more. Further, upon identification that the first interface element 212A is the high carbon-emitting interface element, the system 202 updates the object model data associated with the first interface element 212A to a low-resolution product image. The first size associated with the updated object model data corresponds to, for example, 720 pixels or less. This indicates that the system 202 reduced the quality of the product image from 1080 pixels or more to 720 pixels or less.

Figure 5A:
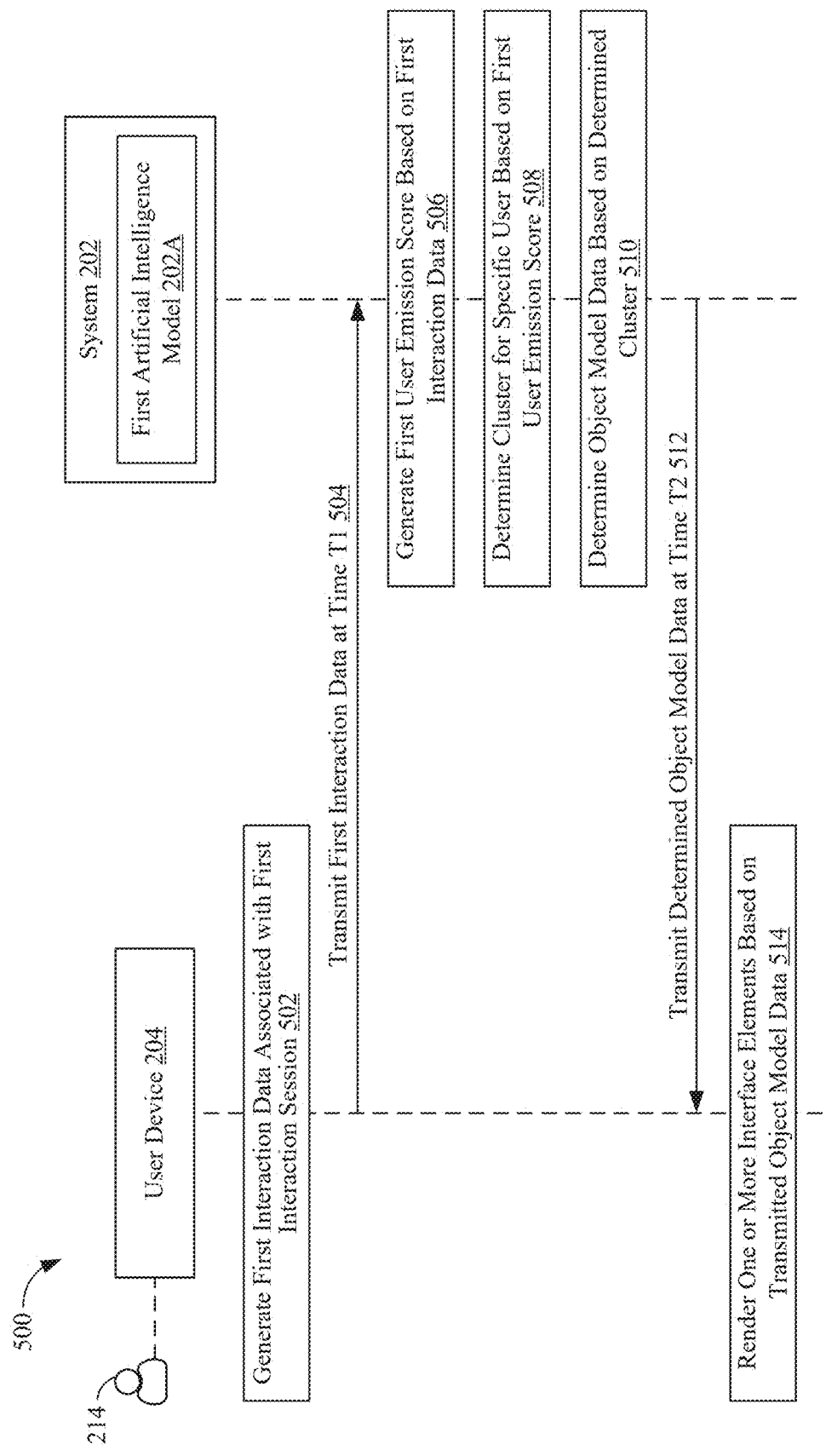
FIG. 5A And FIG. 5B are diagrams that collectively illustrate a flow diagram that depicts reassigning a specific user from a cluster to an updated cluster, in accordance with an embodiment of the disclosure.
Figure 5B:
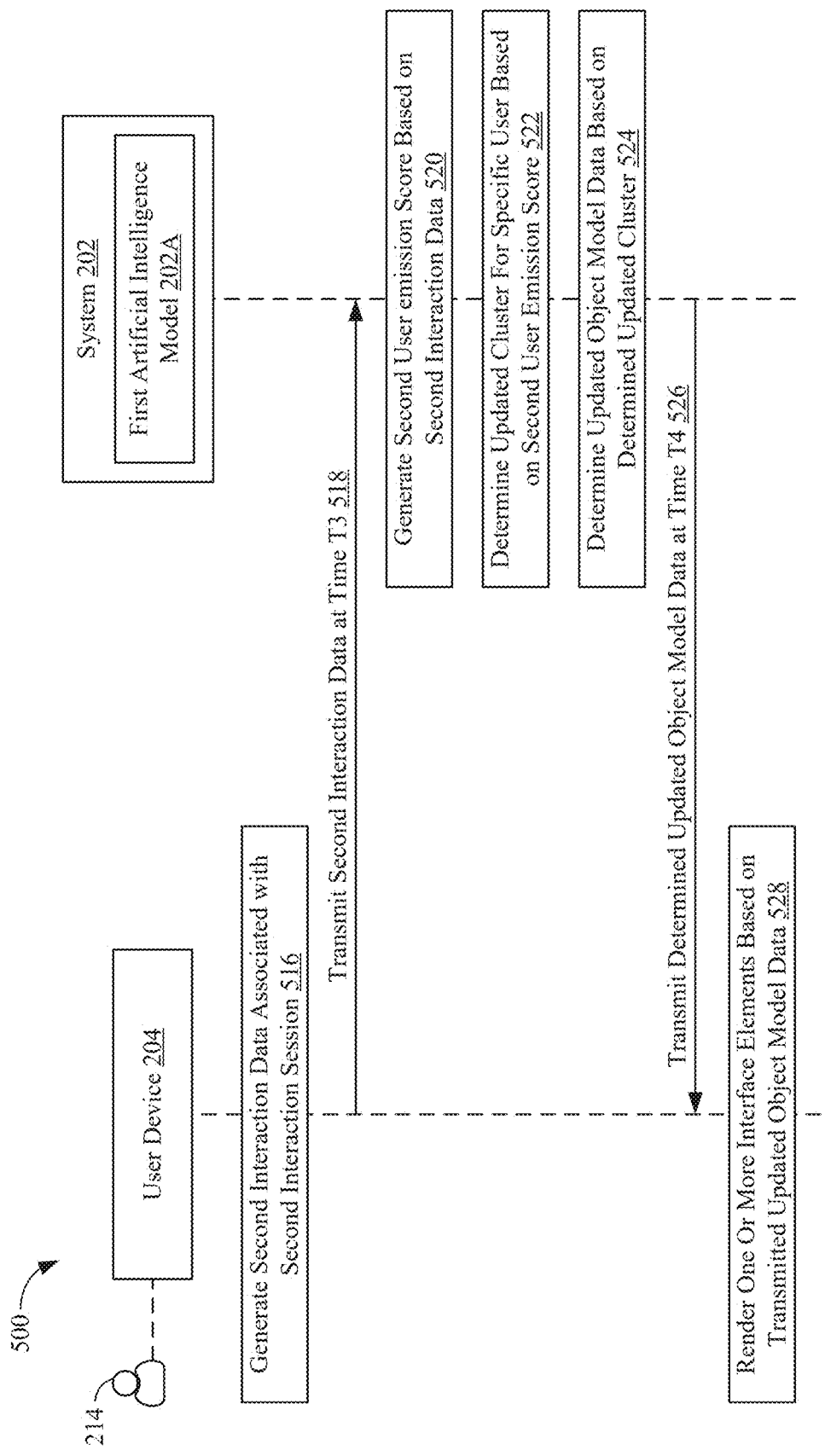

FIG. 5A And FIG. 5B are diagrams that collectively illustrate a flow diagram 500 that depicts reassigning the specific user 214 from a cluster to an updated cluster, in accordance with an embodiment of the disclosure. FIG. 5A and FIG. 5B are explained in conjunction with elements from FIG. 1, FIG. 2, FIG. 3, and FIG. 4.

In an embodiment, the specific user 214 performs the operation 210 within the application 208 on the user device 204. For performing the operation 210, the specific user 214 interacts with the one or more interface elements 212 associated with the operation 210. A time period during which the specific user 214 interacts with the one or more interface elements 212 is referred to as a first interaction session.

At 502, first interaction data associated with the first interaction session may be generated at the user device 204.

The first interaction session may be between the specific user 214 and the one or more interface elements 212 associated with the operation 210 of the application 208 on the user device 204. For example, the specific user 214 perform the operation 210 corresponding to buying a product on the application 208 (such as, the E-commerce application). For the execution of the operation 210, i.e., buying of the product, the specific user 214 interacts with one or more interface elements 212, such as search bar, product description, product images, reviews, payment interface, etc. The one or more interface elements 212 may correspond to, for example, buttons, such as "add to cart", "proceed to buy", etc., images associated with one or more products, text field for searching a desired product, and the like. Based on the interaction of the specific user 214 with the one or more interface elements 212, the first interaction data is generated.

At 504, the user device 204 transmits the first interaction data to the system 202. The system 202 is configured to receive the first interaction data associated with the first interaction session between the specific user 214 and the one or more interface elements 212. In an exemplary embodiment, the first interaction session ends at time T1, subsequently, the user device 204 transmits the first interaction data at time "T1". The first interaction data may include a pattern in which the specific user 214 interacts with the one or more interface elements 212 while performing the operation 210 during the first interaction session. For example, the first interaction data associated with the first interaction session indicates that the specific user 214 interacted with the button labeled as "add to cart" 5 times, the text field for searching the desired product 10 times, and the button labeled as "proceed to buy" 1 time. The first interaction data may also include a count of interaction between the specific user 214 and same or different images of one or more products searched by the specific user 214 and/or offered by the application 208.

At 506, the system 202 is configured to generate a first user emission score for the specific user 214 based on the first interaction data. In an embodiment, the system 202 may generate the first user emission score for the specific user 214 for the first interaction session. In an example, to generate the first user emission score, the system 202 receives the emission value data 206A associated with each interface element of the one or more interface elements 212 from the database 206. Further, upon receiving the emission value data 206A, the system 202 generates the first user emission score for the specific user 214. The first user emission score may correspond to for example, 60 g $CO_2e$.

At 508, the system 202 is configured to determine a cluster for the specific user 214 based on the generated first user emission score. In an embodiment, the system 202 may utilize the first AI model 202A to determine the cluster for the specific user 214. The system 202 may provide the first interaction data and the cluster data as input to the first AI model 202A to determine the cluster for the specific user 214. The cluster data may include user emission score associated with each user of the plurality of users associated with each cluster of the plurality of clusters.

The system 202 may further generate the cluster emission score associated with each cluster of the plurality of clusters 202B. Pursuant to the present example, based on the interaction data and the emission value data, the system 202 determines the first user emission score for the specific user 214. Based on the first user emission score, the system 202 may identify a cluster, say a first cluster to which the specific user 214 may then be assigned. Thereafter, the system 202 determines cluster emission score. In this regard, the system 202 may retrieve cluster data for the cluster. The cluster data may include user emission scores of a plurality of users that are grouped within the cluster. Due to the addition of the specific user 214, the cluster emission score, such as an average of the user emission scores of the plurality of users and the first emission score, for the cluster may be regenerated. For example, the generated cluster emission score associated with the cluster, such as the first cluster corresponds to 75 g $CO_2e$. It may be noted that such grouping of the specific user 214 within the first cluster, i.e., cluster with high emission users is only exemplary.

In an exemplary embodiment, the first AI model 202A analyses the first interaction data and the generated cluster data associated with each cluster of the plurality of clusters 202B to determine the cluster for the specific user 214.

At 510, the system 202 is configured to determine object model data based on the determined cluster. In an exemplary embodiment, if the system 202 determines that the cluster assigned to the specific user 214 corresponds to the cluster that may be a high emission cluster, the system 202 determines the object model data such that the object model data may reduce emission score of the specific user 214. For example, the generated object model data may cause to reduce resolution, font, size, etc. of one or more interface elements 212 associated with the operation 210 to reduce emission of the specific user 214.

For example, the system 202 may determine, using the first AI model 202A trained on historical training sessions, that if users within the cluster in which the specific user 214 is grouped are performing the operation 210 corresponding to buying of a product on the application 208, high-resolution videos of the product may be displayed to the users. Further, once the system 202 assigns the specific user 214 to the cluster under consideration, the system 202 determines the object model data associated with the first interface element 212A (say video of the product) to be of lower resolution than 720 pixels.

At 512, the system 202 is further configured to transmit the determined object model data to the user device 204. In an exemplary embodiment, the user device 204 may receive the determined object model data from the system 202 at time "T2".

At 514, the user device 204 is configured to render one or more interface elements based on the received object model data. In an exemplary embodiment, based on the specific user 214 being grouped within the cluster, the user device 204 may render the lower-resolution videos (720 pixels) of the product on the user device 204. Similarly, the user device 204 may render each of the one or more interface elements 212 associated with the operation 210 in line with the object model data associated with the cluster of the plurality of clusters 202B.

At 516, second interaction data associated with a second interaction session of the specific user 214 is generated. The process of generation of the second interaction data associated with the second interaction session may be similar to the process of generation of the first interaction data associated with the first interaction session described in 502. The second interaction session may be initiated at or after time "T2".

At 518, the generated second interaction data associated with the second interaction session is transmitted to the system 202 at the time "T3" occurring after the time "T2". The system 202 is configured to receive the second interaction data associated with the second interaction of the specific user 214 from the user device 204.

At 520, the system 202 is configured to generate a second user emission score associated with the specific user 214 based on the received second interaction data. In an embodiment, the process of generation of the second user emission score associated with the specific user 214 is similar to the process of generation of the first user emission score associated with the specific user 214 described in 506. In an exemplary embodiment, the second user emission score corresponds to 85 g $CO_2$e. In an embodiment, the second user emission score associated with the specific user 214 may indicate that the interaction of the specific user 214 with the one or more interface elements 212 associated with the operation 210 has increased after the time "T2". This may further indicate that the specific user 214 is emitting more carbon at or after the time "T2" as compared to until the time "T1".

In an exemplary embodiment, the system 202 is configured to dynamically update the user emission score based on the second interaction data which indicates the current interaction of the specific user 214 with the at least one interface element of the one or more interface elements 212 associated with the operation 210 of the application 208. As the specific user 214 interacts with one or more interface elements 212, such as viewing additional product images, clicking on new categories, or applying filters, the system 202 may receive the second interaction data and recalibrate the user emission score associated with the specific user 214 accordingly, such as in real-time or near real-time. The dynamic adjustment ensures that the user emission score accurately indicates the current carbon impact of the specific user 214 based on the latest interactions (the second interaction session). For example, the second interaction session may be in near real-time with respect to the first interaction session.

At 522, the system 202 is configured to determine updated cluster for the specific user 214 based on the second user emission score. In an exemplary embodiment, the process of determination of the updated cluster for the specific user 214 is similar to the process of determination of the cluster for the specific user 214 described in 508.

In an exemplary embodiment, based on the second user emission score associated with the specific user 214, the system 202 determines the updated cluster, such as a second cluster in which the specific user may be grouped. For example, the system 202 may analyze cluster data associated with each of the plurality of clusters to identify the updated cluster for the specific user 214. Further, the cluster data for the updated cluster, say the second cluster may then be used to determine cluster emission score for the second cluster in which the specific user 214 is grouped. Pursuant to the present example, the second cluster includes users having emission values higher than emission values of users of the first cluster. In other words, the second cluster may correspond to a higher emission score than the first cluster. To this end, such depiction of the second cluster being associated with higher emission score and the first cluster being associated with lower emission score is only exemplary and should not be construed as a limitation. In an example, the first cluster may correspond to high emission score and the second cluster may correspond to low emission score.

At 524, the system 202 is configured to determine the updated object model data based on the determined updated cluster. In an embodiment, the process of the determination of the updated object model data is similar to the process of the determination of the object model data described in 510.

In an exemplary embodiment, the system 202 determines that frequency of interaction between the specific user 214 with the first interface element 212A (the high-resolution video of the product) has increased after the time T2 during the second interaction session. The system 202 identifies the first interface element 212A and determines the updated object model data associated with the first interface element 212A. In an embodiment, the updated object model data associated with the first interface element 212A may further correspond to reduced resolution, such as a resolution less than 480 pixels for the first interface element 212A.

In an exemplary embodiment, the system 202 receives a user input from the specific user 214 associated with the plurality of interface elements. Further, the system 202 may update the object model data associated with the at least one interface element of the one or more interface elements based on the user input. For example, if the user input indicates that the specific user 214 does not want to reduce the resolution of the first interface element 212A, i.e., the video, then the system 202 may identify other interface elements that may be modified to reduce emission score of the specific user 214.

At 526, the system 202 transmits the determined updated object model data to the user device 204. In an exemplary embodiment, the user device 204 associated with the specific user 214 receives the transmitted updated object model data at time T4.

At 528, the user device 204 associated with the specific user 214 is configured to render the one or more interface elements 212 based on the transmitted updated object model data 528. In a first example, if the user device 204 may be rendering the high-resolution image of the product at time "T1" while the specific user 214 may be in the first cluster (moderate emission cluster). Further, the user device 204 may render the low-resolution image of the product at a time "T4" while the specific user 214 may be in the second cluster (high emission cluster). In a second example, if the user device 204 may be rendering the first interface element 212A, the second interface element 212B, and the third interface element 212C at the time "T1" while the specific user 214 may be in the first cluster and the system 202 determines that the third interface element 212C may be the high carbon-emitting element, then the user device 204 may render the first interface element 212A and the second interface element 212B to the specific user 214 at time "T4".

Figure 6:
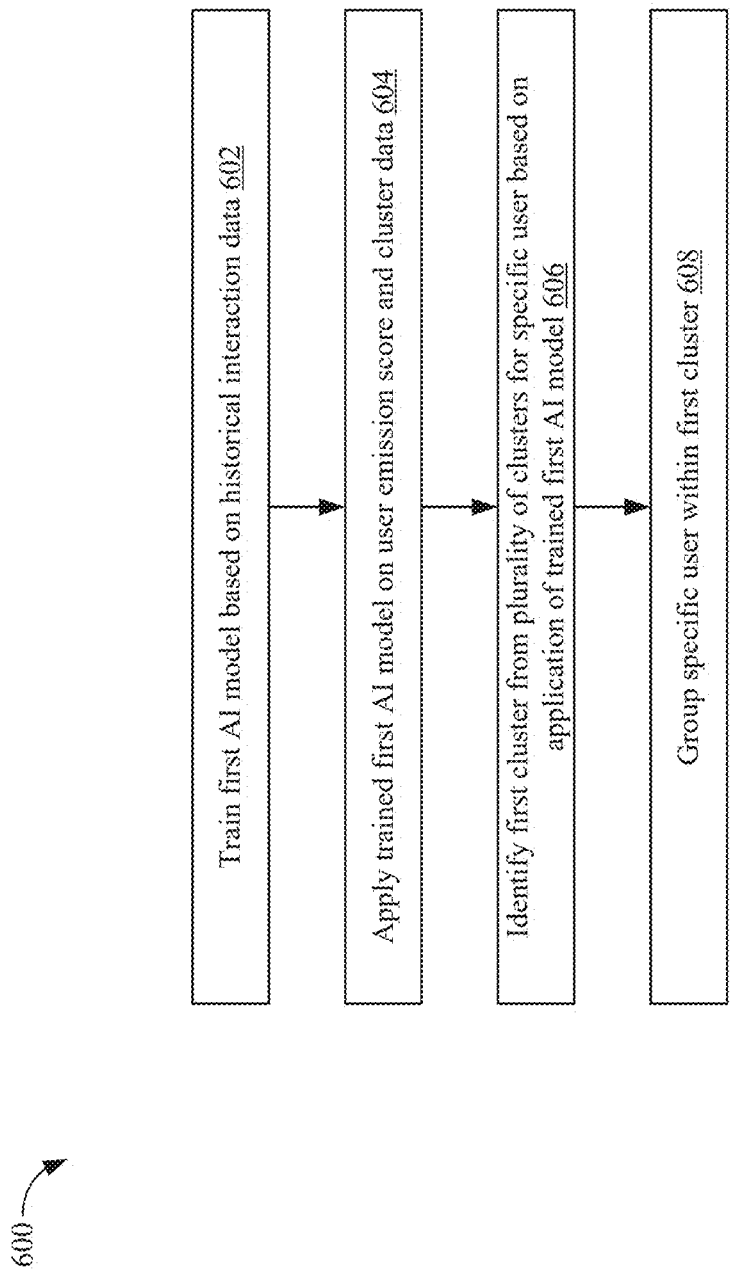
FIG. 6 is a diagram that illustrates a flowchart associated with training of a first AI model to group the specific user with a first cluster, in accordance with an embodiment of the disclosure.

FIG. 6 is a diagram that illustrates a flowchart 600 associated with the training of the first AI model 202A to group the specific user 214 with the first cluster, in accordance with an embodiment of the disclosure. FIG. 6 is explained in conjunction with elements from FIG. 1, FIG. 2, FIG. 3, FIG. 4, FIG. 5A, and FIG. 5B.

At 602, the system 202 is configured to train the first AI model 202A based on the historical interaction data. In an exemplary embodiment, the historical interaction data is associated with historical interaction events. The historical interaction events may have taken place for example, but not limited to, 1 day before the current day of operation, 2 days before the current day of operation, 1 week before the current day of operation, 1 month before the current and 1 year before the current day of operation. The current day of operation may correspond to the current interaction session between the specific user 214 and the one or more interface elements 212 associated with the operation 210 of the application 208.

In an exemplary embodiment, the historical interaction data associated with a plurality of training interaction sessions between a plurality of training users and the operation 210 of the application 208 includes, for example, but is not limited to, a plurality of historical user emission scores. In an embodiment, the first AI model 202A is trained on the historical interaction data to classify the plurality of users into multiple clusters based on their corresponding user emission scores and cluster data associated with each cluster of the plurality of clusters 202B. In an exemplary embodiment, the first AI model 202A may employ algorithms such as k-means clustering or hierarchical clustering to identify patterns in the interaction behavior of the plurality of users and their corresponding user emission scores. By processing large datasets that include user demographics, behavioral traits, and emission metrics, the first AI model 202A identifies distinct user segments, and each segment is associated with a unique profile of emissions.

In an exemplary scenario, the system 202 segments the plurality of training users into the plurality of clusters 202B. The plurality of training users is clustered into categories such as "low emitters," "moderate emitters," and "high emitters," based on their user emission scores associated with the corresponding training interaction sessions.

At 604, the system 202 is configured to apply the first AI model 202A on the user emission score and the cluster data. In an embodiment, the system 202 generates the user emission score for the specific user 214. Further, the system 202 determines the cluster data associated with each cluster of the plurality of clusters 202B.

In an exemplary embodiment, the user emission score associated with the specific user 214 corresponds to 60 g $CO_2e$. Further, the system 202 determines the cluster data including the plurality of user emission scores associated with the plurality of users. For example, a first user emission score associated with a first user corresponds to 30 g $CO_2e$, a second user emission score associated with a second user corresponds to 35 g $CO_2e$, and a third user emission score associated with a third user corresponds to 55 g $CO_2e$. Further, the system 202 applies the first AI model 202A on the user emission score associated with the specific user 214 and the cluster data associated with each of the plurality of clusters 202B.

At 606, the system 202 is configured to identify the first cluster from the plurality of clusters 202B for the specific user 214 based on the application of the trained first AI model 202A on the user emission score associated with the specific user 214 and the cluster data. In an embodiment, the system 202 utilizes the trained first AI model 202A to identify the cluster for the specific user 214.

As a first example, the system 202 segments the plurality of users into the plurality of clusters 202B. As described in 604, the first user emission score associated with the first user of the plurality of users corresponds to 30 g $CO_2e$, and the second user emission score associated with the second user of the plurality of users corresponds to 35 g $CO_2e$. Further, the third user emission score associated with the third user corresponds to 55 g $CO_2e$. Based on the first user emission score, the second user emission score, and the third user emission score, the system 202 utilizes the trained first AI model 202A to determine that the first user (30 g $CO_2e$) and the second user have similar carbon emission scores (35 g $CO_2e$). Further, the system 202 assigns the first user and the second user to the same cluster (For example, second cluster) of the plurality of clusters 202B. Similarly, the system 202 utilizes the trained AI model 202A to assign the cluster to the specific user 214. The system 202 determines that the user emission score of the specific user 214 (60 g $CO_2e$) and the third user (55 g $CO_2e$) are closely similar.

Further, upon calculating the centroids, the system 202 evaluates the user emission scores associated with each user of the plurality of users, for example, the first user with user emission score of 30 g $CO_2e$, the second user with user emission score of 35 g $CO_2e$, and the third user with user emission score of 55 g $CO_2e$, along with the specific user 214 with user emission score of 60 g $CO_2e$. The system 202 then assigns each user to the cluster whose centroid is closest, using Euclidean distance as the metric.

As a second example, the system 202 is configured to utilize the cluster data associated with the first cluster to determine the user emission score associated with each user of the plurality of users within the first cluster. Similarly, the system 202 is configured to utilize the cluster data associated with the second cluster of the plurality of clusters and the third cluster of the plurality of clusters to determine the user emissions score of each user of the plurality of users within the second cluster, and each user of the plurality of users within the third cluster. Further, upon the determination of the user emission score associated with each user of the plurality of users associated with the first cluster, the second cluster, and the third cluster, the system 202 is configured to determine the cluster emission score (that may be mean of the user emission score of plurality of users) for each cluster of the plurality of clusters 202B. For example, the cluster emission score associated with the first cluster corresponds to 80 g $CO_2e$, the cluster emission score associated with the second cluster corresponds to 60 g $CO_2e$, and the cluster emission score associated with the first cluster corresponds to 40 g $CO_2e$. In a scenario, if the user emission score associated with the specific user 214 corresponds to 65 g $CO_2e$, then the system 202 may assign the specific user 214 to the second cluster of the plurality of clusters 202B.

In an exemplary embodiment, the system 202 applies the K-means clustering approach, the system 202 initializes a predefined number of clusters (say 3 clusters) based on user emission scores of each user of the plurality of users. Each user of the plurality is represented as a point in a multi-dimensional space where the dimensions correspond to their carbon emission metrics. Initially, the system 202 randomly selects 3 centroids, each representing a potential cluster.

At 608, the system 202 is configured to group the specific user 214 within the first cluster. For example, system 202 groups the first user and the second user together due to their proximity in user emission scores. Further, the system 202 clusters the specific user 214 and the third user based on their closer user emission scores of 60 g $CO_2e$ and 55 g $CO_2e$, respectively.

Further, once each user of the plurality of users is assigned to their corresponding clusters, the system 202 recalculates the centroids by computing the mean of the user emission scores within each cluster. The process of assignment and centroid recalculation continues iteratively until convergence is reached.

Figure 7:
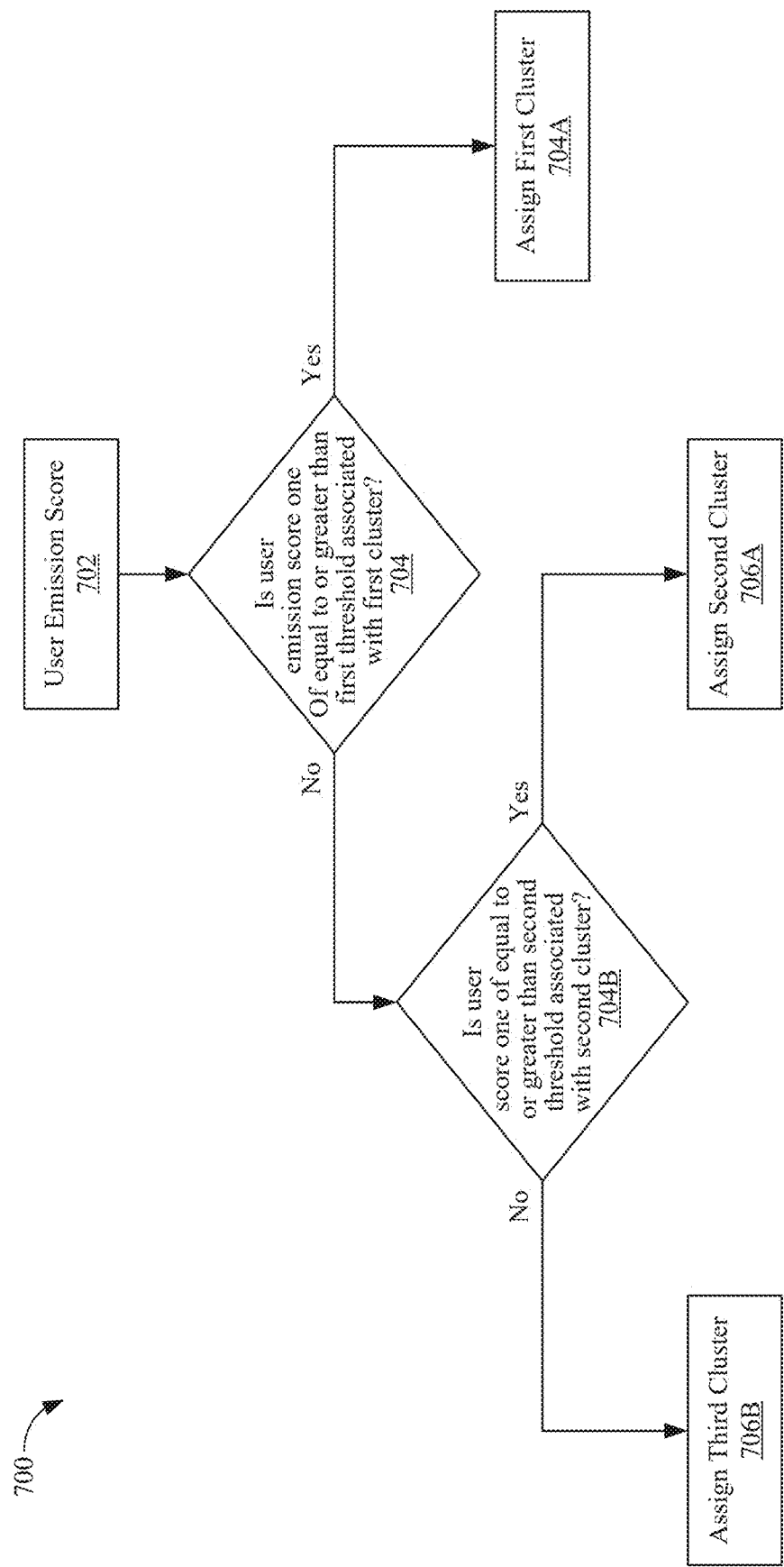
FIG. 7 is a diagram that illustrates a comparison of the user emission score with a plurality of thresholds to determine the cluster for the specific user, in accordance with an embodiment of the disclosure.

FIG. 7 is a diagram 700 that illustrates a comparison of the user emission score with a plurality of thresholds to determine the cluster for the specific user 214, in accordance with an embodiment of the disclosure. FIG. 7 is explained in conjunction with elements from FIG. 1, FIG. 2, FIG. 3, FIG. 4, FIG. 5A, FIG. 5B, and FIG. 6.

At 702, the system 202 generates the user emission score associated with the interaction session of the specific user 214 based on the first interaction data.

At 704, the system 202 is further configured to determine if the user emission score generated at 702 of the specific user 214 is one of equal to or greater than the first threshold associated with the first cluster of the plurality of clusters 202B. In an embodiment, the system 202 compares the user emission score with a plurality of thresholds. Each threshold of the plurality of thresholds corresponds to a respective cluster of the plurality of clusters 202B.

In an exemplary embodiment, the system 202 is designed to evaluate the user emission score of the specific user 214 to determine if it is equal to or greater than the first threshold that corresponds to the first cluster of the plurality of clusters 202B. In an exemplary embodiment, the system 202 retrieves the first threshold from the database 206. In an alternate exemplary embodiment, the system 202 receives the first threshold from an administrator of the application 208.

Further, the system 202 determines that the first cluster is defined for users with user emission scores greater than or equal to 75 g $CO_2e$, categorizing them as high carbon-emitting users. The system 202 generates the user emission score of the specific user 214. The generated user emission score is 80 g $CO_2e$. The system 202 further compares this score against the threshold of 75 g $CO_2e$. As 80 g $CO_2e$ is greater than the first threshold, the system 202 determines that the specific user 214 qualifies for inclusion in the first cluster of the plurality of clusters 202B, the control may pass to 704A.

At 704A, the system 202 will assign the specific user 214 to the first cluster which may be a high-emission cluster. In an exemplary embodiment, if the system 202 determines based on the comparison that the user emission score associated with the specific user 214 is less than the first threshold associated with the first cluster, the control may pass to 704B.

At 704B, the system 202 is further configured to determine if the user emission score of the specific user 214 is one of equal to or greater than a second threshold associated with the second cluster of the plurality of clusters 202B. In an embodiment, the system 202 compares the user emission score with a plurality of thresholds. Each threshold of the plurality of thresholds corresponds to a respective cluster of the plurality of clusters 202B.

In an exemplary embodiment, the system 202 is designed to evaluate the user emission score of the specific user 214 to determine if it is equal to or greater than the second threshold that corresponds to the second cluster of the plurality of clusters 202B. In an exemplary embodiment, the system 202 retrieves the second threshold from the database 206. In an alternate exemplary embodiment, the system 202 receives the second threshold from an administrator of the application 208.

Further, the system 202 determines that the second cluster is defined for users with user emission scores greater than or equal to 51 g $CO_2e$ and less than the first threshold associated with the first cluster (say 75 g $CO_2e$), categorizing them as moderate carbon-emitting users. The system 202 generates the user emission score of the specific user 214, which is 57 g $CO_2e$. The system 202 further compares the user emission score against the second threshold. As 57 g $CO_2e$ is greater than the second threshold and less than the first threshold, the system 202 determines that the specific user 214 qualifies for inclusion in the second cluster of the plurality of clusters 202B, and the control may pass to 706A.

At 706A, the system 202 will assign the specific user 214 to the moderate-emission cluster (such as the second cluster). In an exemplary embodiment, if the system 202 determines based on the comparison that the user emission score associated with the specific user 214 is less than the second threshold associated with the second cluster, the control may pass to 706B.

At 706B, the system 202 is configured to assign the specific user 214 to the third cluster of the plurality of clusters 202B. In an embodiment, the system 202 determines that the third cluster is defined for users with user emission scores greater than 0 g $CO_2e$ and less than the second threshold associated with the second cluster (say 51 g $CO_2e$), categorizing them as low carbon-emitting users.

Figure 8:
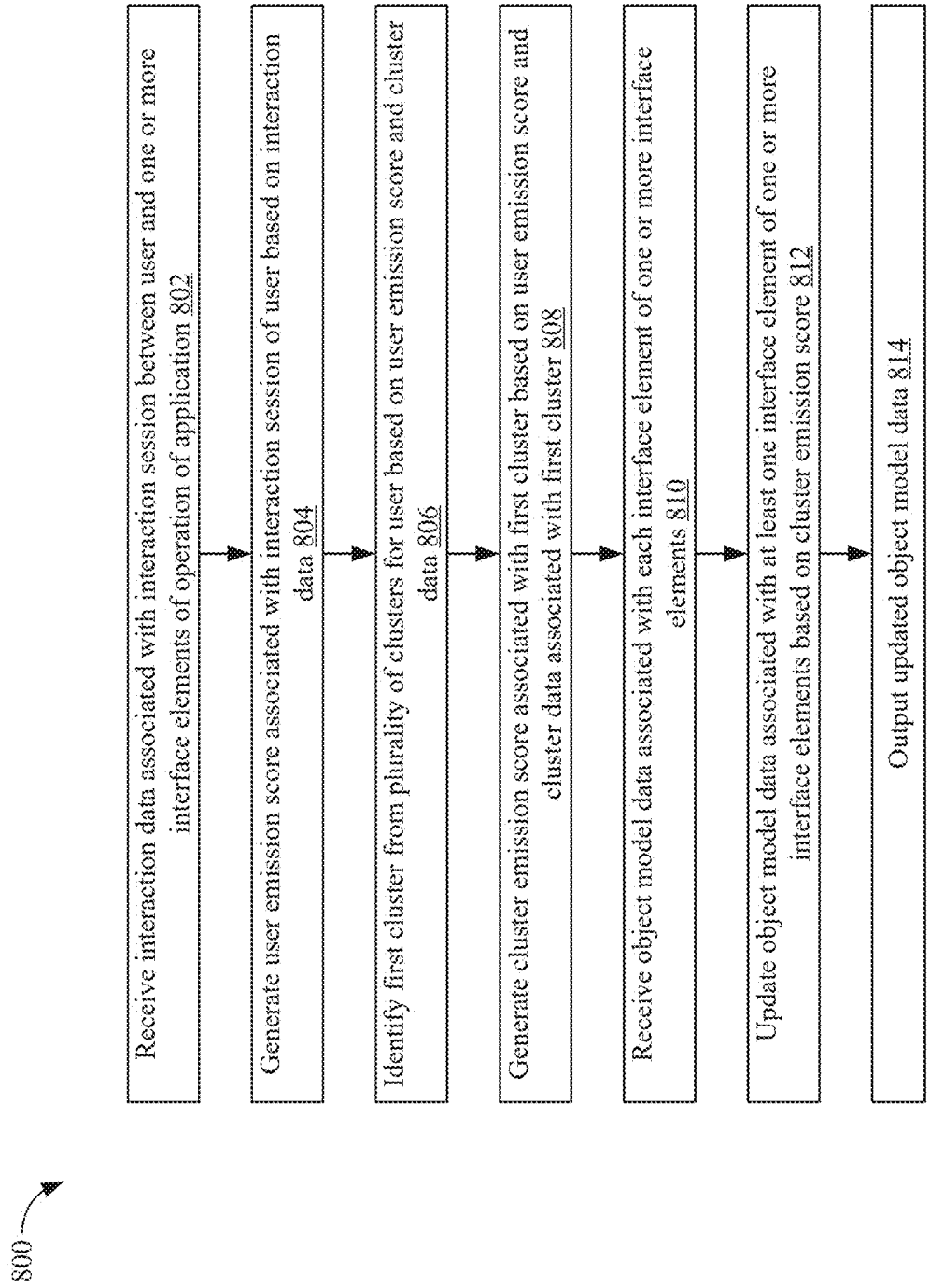
FIG. 8 illustrates a flowchart of an exemplary method for updating object model data of interface elements based on emission scores, in accordance with an embodiment of the disclosure.

FIG. 8 illustrates a flowchart 800 of an exemplary method for updating object model data based on emission scores, in accordance with an embodiment of the disclosure. FIG. 8 is explained in conjunction with elements of FIG. 1, FIG. 2, FIG. 3, FIG. 4, FIG. 5A, FIG. 5B, FIG. 6, and FIG. 7. With reference to FIG. 8, there is shown a flowchart 800. The operations of the exemplary method may be executed by any computing system, for example, by the computer 102 of FIG. 1 or the system 202 of FIG. 2. The operations of the flowchart 800 may start at 802.

At 802, the first interaction data associated with the interaction session between the specific user 214 and the one or more interface elements of the operation 210 of the application 208 is received. In an embodiment, the system 202 is configured to receive the interaction data associated with the interaction session between the specific user 214 and the one or more interface elements of the operation 210 of the application 208.

At 804, the user emission score associated with the interaction session of the specific user 214 is generated based on the first interaction data. In an embodiment, the system 202 is configured to generate the user emission score associated with the interaction session of the specific user 214 based on the first interaction data.

At 806, the first cluster from the plurality of clusters 202B for the user is identified based on the user emission score and the cluster data. In an embodiment, the system 202 is configured to identify the first cluster from the plurality of clusters 202B for the user based on the user emission score and the cluster data.

At 808, the cluster emission score associated with the first cluster is generated based on the user emission score and the cluster data associated with the first cluster. In an embodiment, the system 202 is configured to generate the cluster emission score associated with the first cluster based on the user emission score and the cluster data associated with the first cluster.

At 810, the object model data associated with each interface element of the one or more interface elements 212 is received. In an embodiment, the system 202 is configured to receive the object model data associated with each interface element of the one or more interface elements 212.

At 812, the object model data associated with at least one interface element of the one or more interface elements 212 is updated based on the cluster emission score. In an embodiment, the system 202 is configured to update the object model data associated with at least one interface element of the one or more interface elements 212 based on the cluster emission score.

At 814, the updated object model is output. In an embodiment, the system 202 is configured to output the updated object model.

According to one or more embodiments of the disclosure, a computer program product for updating of object model data is disclosed. The computer program product includes one or more computer-readable storage media and program instructions stored on the one or more computer-readable storage media to perform operations. The operations include receiving interaction data associated with an interaction session between a specific user and one or more interface elements of an operation of an application. The operations further include generating a user emission score associated with the interaction session of the specific user based on the interaction data. The operations further include identifying a first cluster from a plurality of clusters for the specific user based on the user emission score and cluster data. The cluster data is associated with each cluster of the plurality of clusters. The operations further include generating a cluster emission score associated with the first cluster based on the user emission score and the cluster data associated with the first cluster. The operations further include receiving object model data associated with each interface element of the one or more interface elements. The operations further include updating the object model data associated with at least one interface element of the one or more interface elements based on the cluster emission score. The operations further include outputting the updated object model data.

The descriptions of the various embodiments of the disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    receiving, by a computer, first interaction data associated with an interaction session between a specific user and one or more interface elements of an operation of an application;
    generating, by the computer, a user emission score associated with the interaction session of the specific user based on the first interaction data;
    identifying, by the computer, a first cluster from a plurality of clusters for the specific user based on the user emission score and cluster data, wherein the cluster data is associated with each cluster of the plurality of clusters;
    generating, by the computer, a cluster emission score associated with the first cluster based on the user emission score and the cluster data associated with the first cluster;
    receiving, by the computer, object model data associated with each interface element of the one or more interface elements;
    updating, by the computer, the object model data associated with at least one interface element of the one or more interface elements based on the cluster emission score; and
    outputting, by the computer, the updated object model data.

2. The computer-implemented method of claim 1, further comprising:
    comparing, by the computer, the user emission score with a plurality of thresholds, wherein each threshold of the plurality of thresholds corresponds to a respective cluster of the plurality of clusters;
    determining, by the computer, the user emission score is one of equal to or greater than a first threshold of the plurality of thresholds, wherein the first threshold is associated with the first cluster; and
    identifying, by the computer, the first cluster from the plurality of clusters for the specific user based on the determining.

3. The computer-implemented method of claim 2, further comprising:
    updating, by the computer, a user interface associated with the operation of the application, wherein the updating of the user interface is based on the updated object model data; and
    rendering, by the computer, the updated user interface.

4. The computer-implemented method of claim 1, further comprising:
    rendering, by the computer, the at least one interface element of the one or more interface elements on a user device based on the updated object model data; and
    performing, by the computer, the operation based on the rendering.

5. The computer-implemented method of claim 4, further comprising rendering, by the computer, the at least one interface element concurrently with the interaction session based on the updated object model data.

6. The computer-implemented method of claim 4, further comprising:
    obtaining, by the computer, second interaction data associated with the interaction session, wherein the second interaction data is associated with an interaction between the specific user and the at least one interface element, and wherein the at least one interface element is updated based on the updated object model data;
    dynamically updating, by the computer, the user emission score based on the second interaction data;
    determining, by the computer, the updated user emission score is one of equal to or greater than a second threshold, wherein the second threshold is associated with a second cluster of the plurality of clusters; and
    reassigning, by the computer, the specific user from the first cluster to the second cluster from the plurality of clusters based on the determining.

7. The computer-implemented method of claim 1, further comprising:
    receiving, by the computer, emission value data associated with each interface element of the one or more interface elements; and
    generating, by the computer, the user emission score based on the emission value data and the first interaction data.

8. The computer-implemented method of claim 7, further comprising:
    determining, by the computer, an element emission score associated with each interface element of the one or more interface elements based on the first interaction data and the emission value data;
    identifying, by the computer, the at least one interface element of the one or more interface elements based on the element emission score, wherein the element emission score of the at least one interface element is greater than an emission threshold; and
    updating, by the computer, the object model data associated with the identified at least one interface element based on the cluster data associated with the first cluster.

9. The computer-implemented method of claim 1, wherein a first size associated with the updated object model data of the at least one interface element is less than a second size associated with the object model data of the at least one interface element.

10. The computer-implemented method of claim 1, wherein the operation of the application is associated with a plurality of interface elements, and wherein the specific user interacts with the one or more interface elements of the plurality of interface elements in the interaction session, the method further comprising:

receiving, by the computer from the specific user, a user input associated with the plurality of the interface elements; and updating, by the computer, the object model data associated with the at least one interface element of the one or more interface elements based on the user input.

11. The computer-implemented method of claim 10, wherein the first cluster comprises a plurality of users performing the operation of the application, and wherein the plurality of users is exclusive of the specific user, the method further comprising:

generating, by the computer, the cluster emission score associated with the first cluster based on the user emission score and a plurality of user emission scores, wherein the cluster data comprises the plurality of user emission scores associated with the plurality of users.

12. The computer-implemented method of claim 1, further comprising:

training, by the computer, a first artificial intelligence (AI) model based on historical interaction data, wherein the historical interaction data is associated with a plurality of training interaction sessions between a plurality of training users and the operation of the application;

applying, by the computer, the trained first AI model on the user emission score and the cluster data;

identifying, by the computer, the first cluster from the plurality of clusters for the specific user based on the application; and grouping, by the computer, the specific user within the first cluster based on the identification.

13. A computer system, comprising:

a processor set;

one or more computer-readable storage media; and program instructions stored on the one or more computer-readable storage media, the program instructions executable by the processor set to cause the processor set to:

receive first interaction data associated with an interaction session between a specific user and one or more interface elements of an operation of an application;

generate a user emission score associated with the interaction session of the specific user based on the first interaction data;

identify a first cluster from a plurality of clusters for the specific user based on the user emission score and cluster data, wherein the cluster data is associated with each cluster of the plurality of clusters;

generate a cluster emission score associated with the first cluster based on the user emission score and the cluster data associated with the first cluster;

receive object model data associated with each interface element of the one or more interface elements;

update the object model data associated with at least one interface element of the one or more interface elements based on the cluster emission score; and render the at least one interface element of the one or more interface elements on a user device based on the updated object model data, wherein the at least one interface element is rendered concurrently with the interaction session.

14. The computer system of claim 13, wherein the program instructions further cause the processor set to:

compare the user emission score with a plurality of thresholds, wherein each threshold of the plurality of thresholds corresponds to a respective cluster of the plurality of clusters;

determine the user emission score is one of equal to or greater than a first threshold of the plurality of thresholds, wherein the first threshold is associated with the first cluster; and identify the first cluster from the plurality of clusters for the specific user based on the determination.

15. The computer system of claim 13, wherein the program instructions further cause the processor set to:

obtain second interaction data associated with the interaction session, wherein the second interaction data is associated with an interaction between the specific user and the at least one interface element, and wherein the at least one interface element is updated based on the updated object model data;

dynamically update the user emission score based on the second interaction data;

determine the updated user emission score is one of equal to or greater than a second threshold, wherein the second threshold is associated with a second cluster of the plurality of clusters; and reassign the specific user from the first cluster to the second cluster from the plurality of clusters based on the determining.

16. The computer system of claim 13, wherein the program instructions further cause the processor set to:

update a user interface associated with the operation of the application, wherein the updating of the user interface is based on the updated object model data; and render the updated user interface on the user device.

17. The computer system of claim 13, wherein the program instructions further cause the processor set to:

receive emission value data associated with each interface element of the one or more interface elements; and generate the user emission score based on the emission value data and the first interaction data.

18. The computer system of claim 17, wherein the program instructions further cause the processor set to:

determine an element emission score associated with each interface element of the one or more interface elements based on the first interaction data and the emission value data;

identify the at least one interface element of the one or more interface elements based on the element emission score, wherein the element emission score of the at least one interface element is greater than an emission threshold; and update the object model data associated with the identified at least one interface element based on the cluster data associated with the first cluster.

19. A computer program product for updating of object model data, the computer program product comprising:

one or more computer-readable storage media; and program instructions stored on the one or more computer-readable storage media to perform operations comprising:

receiving first interaction data associated with an interaction session between a specific user and one or more interface elements of an operation of an application;

generating a user emission score associated with the interaction session of the specific user based on the first interaction data;

identifying a first cluster from a plurality of clusters for the specific user based on the user emission score and cluster data, wherein the cluster data is associated with each cluster of the plurality of clusters;

generating a cluster emission score associated with the first cluster based on the user emission score and the cluster data associated with the first cluster;

receiving the object model data associated with each interface element of the one or more interface elements;

updating the object model data associated with at least one interface element of the one or more interface elements based on the cluster emission score; and outputting the updated object model data.

20. The computer program product of claim 19, the operations further comprising:

rendering the at least one interface element of the one or more interface elements on a user device concurrently with the interaction session based on the updated object model data; and performing the operation based on the rendering.

\* \* \* \* \*